United States Patent
Brown et al.

(10) Patent No.: US 10,479,718 B2
(45) Date of Patent: Nov. 19, 2019

(54) APPARATUS AND METHODS FOR SEPARATING A GLASS RIBBON

(71) Applicant: Corning Incorporated, Corning, NY (US)

(72) Inventors: James William Brown, Painted Post, NY (US); Tatyana Vyacheslavovna Brown, Elmira, NY (US); Marvin William Kemmerer, Odessa, NY (US); Weiwei Luo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 10 days.

(21) Appl. No.: 15/772,252

(22) PCT Filed: Oct. 27, 2016

(86) PCT No.: PCT/US2016/058992
§ 371 (c)(1),
(2) Date: Apr. 30, 2018

(87) PCT Pub. No.: WO2017/075133
PCT Pub. Date: May 4, 2017

(65) Prior Publication Data
US 2019/0077695 A1    Mar. 14, 2019

Related U.S. Application Data

(60) Provisional application No. 62/248,367, filed on Oct. 30, 2015.

(51) Int. Cl.
*C03B 33/10*    (2006.01)
*C03B 33/023*    (2006.01)
(Continued)

(52) U.S. Cl.
CPC ...... *C03B 33/0235* (2013.01); *C03B 33/0215* (2013.01); *C03B 33/03* (2013.01);
(Continued)

(58) Field of Classification Search
CPC ............. C03B 33/105; C03B 33/0235; C03B 33/0215; C03B 33/03; C03B 33/033; C03B 33/161
See application file for complete search history.

(56) References Cited

U.S. PATENT DOCUMENTS 4,435,902 A    3/1984  Mercer et al.
5,620,491 A *  4/1997  Puhl .................. B03B 9/062
                                              134/25.1
(Continued)

FOREIGN PATENT DOCUMENTS

EP    2177482 B1    3/2011
JP    2008094690 A  4/2008
(Continued)

OTHER PUBLICATIONS

International Search Report and Written Opinion of the International Searching Authority; PCT/US2016/058992; dated Jun. 1, 2017; 11 Pages; Korean Patent Office.

*Primary Examiner* — Sean M Michalski

(57) ABSTRACT

A glass manufacturing apparatus may be configured to facilitate a process of separating a glass ribbon along a separation path extending across a width of the glass ribbon. In one example, the glass manufacturing apparatus comprises at least one anvil-side vacuum port defined by an elongated nose and an elongated anvil member. The anvil-side vacuum port is configured to remove glass debris during the process of separating the glass ribbon. In another example, the glass manufacturing apparatus comprises a scoring device and a score-side vacuum port configured to
(Continued)

remove glass debris generated during the process of separating the glass ribbon.

19 Claims, 20 Drawing Sheets

(51) Int. Cl.
    *C03B 33/02* (2006.01)
    *C03B 33/033* (2006.01)
    *C03B 33/03* (2006.01)
    *C03B 35/16* (2006.01)
    *C03B 35/18* (2006.01)

(52) U.S. Cl.
    CPC .......... *C03B 33/033* (2013.01); *C03B 33/10* (2013.01); *C03B 33/105* (2013.01); *C03B 35/161* (2013.01); *C03B 35/18* (2013.01); *B65G 2249/04* (2013.01)

(56) References Cited

U.S. PATENT DOCUMENTS

| | | | |
|---|---|---|---|
| 6,463,762 B1 * | 10/2002 | Ross, Jr. | B65G 49/061 225/2 |
| 7,553,390 B2 | 6/2009 | Yamabuchi et al. | |
| 7,895,861 B2 * | 3/2011 | Chalk | C03B 33/0215 65/174 |
| 8,245,539 B2 | 8/2012 | Lu et al. | |
| 8,978,417 B2 | 3/2015 | Abramov et al. | |
| 9,027,815 B2 * | 5/2015 | Kudva | B26F 3/002 225/2 |
| 9,828,276 B2 * | 11/2017 | Brown | B25B 11/005 |
| 2004/0226927 A1 * | 11/2004 | Morikazu | B23K 26/123 219/121.84 |
| 2006/0042314 A1 | 3/2006 | Abbott, III et al. | |
| 2006/0261118 A1 * | 11/2006 | Cox | B26F 3/002 225/96 |
| 2006/0285064 A1 * | 12/2006 | Lee | C03B 33/037 349/187 |
| 2009/0250497 A1 | 10/2009 | Cox et al. | |
| 2011/0094267 A1 | 4/2011 | Aniolek et al. | |
| 2011/0277507 A1 * | 11/2011 | Lu | C03B 33/0215 65/97 |
| 2014/0373572 A1 | 12/2014 | Brown et al. | |
| 2019/0077695 A1 * | 3/2019 | Brown | C03B 33/0215 |

FOREIGN PATENT DOCUMENTS

| | | |
|---|---|---|
| JP | 2008094691 A | 4/2008 |
| JP | 2008094692 A | 4/2008 |
| WO | 2014209833 A1 | 12/2014 |

* cited by examiner

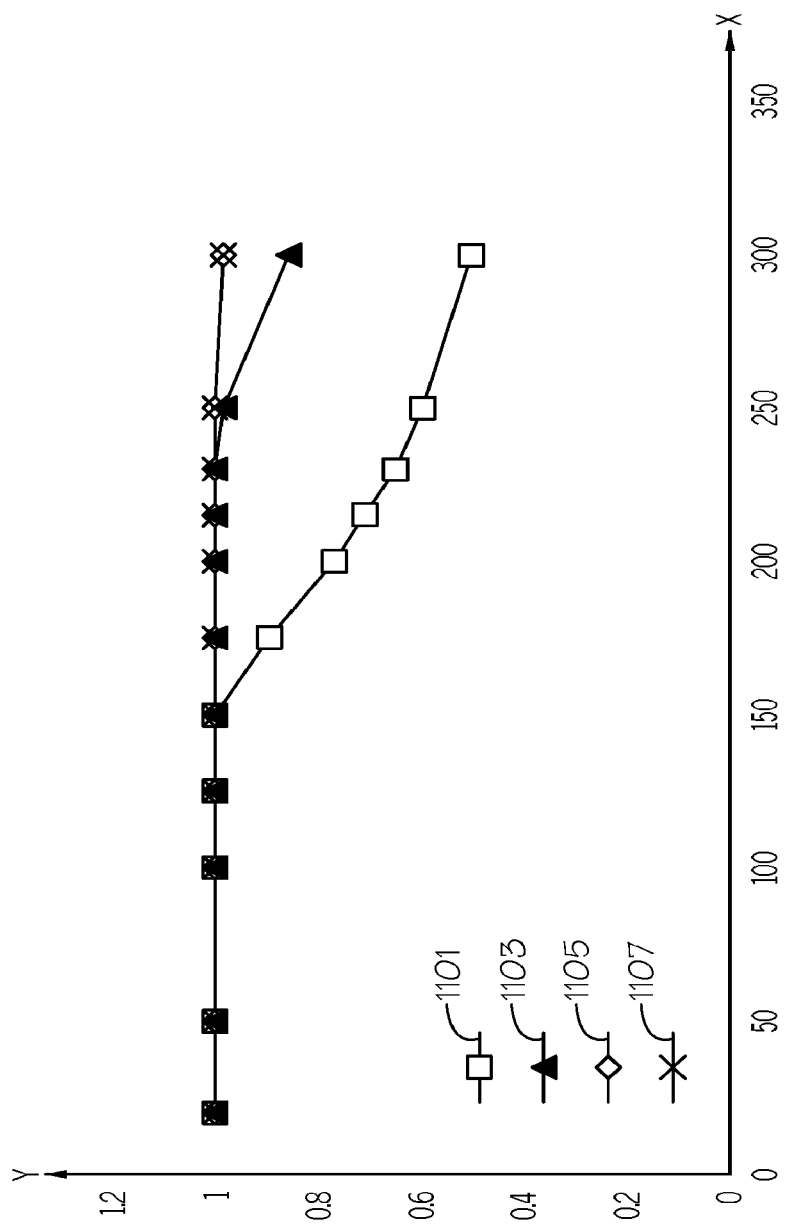

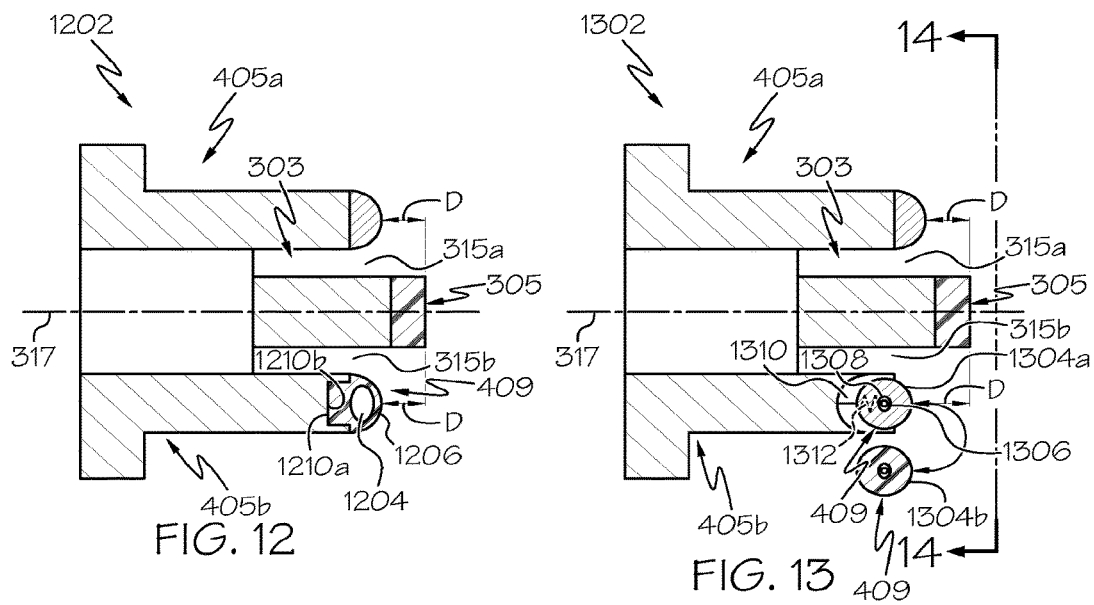
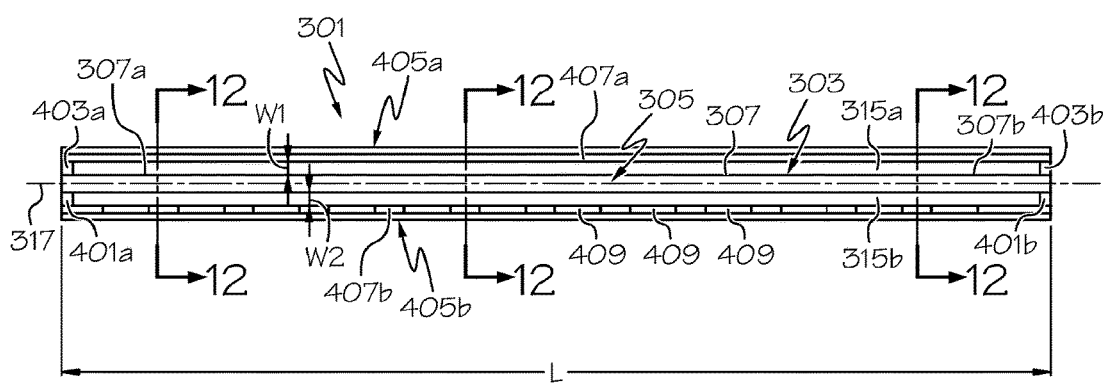

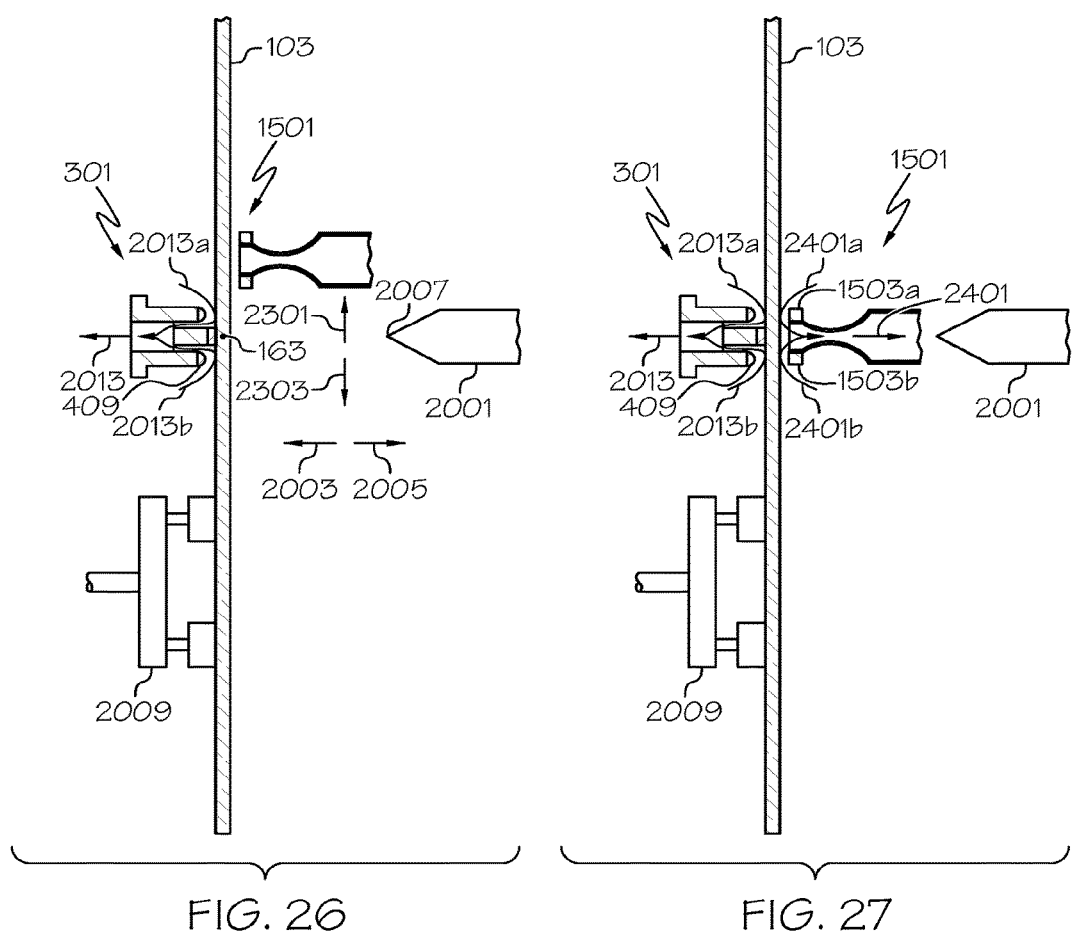

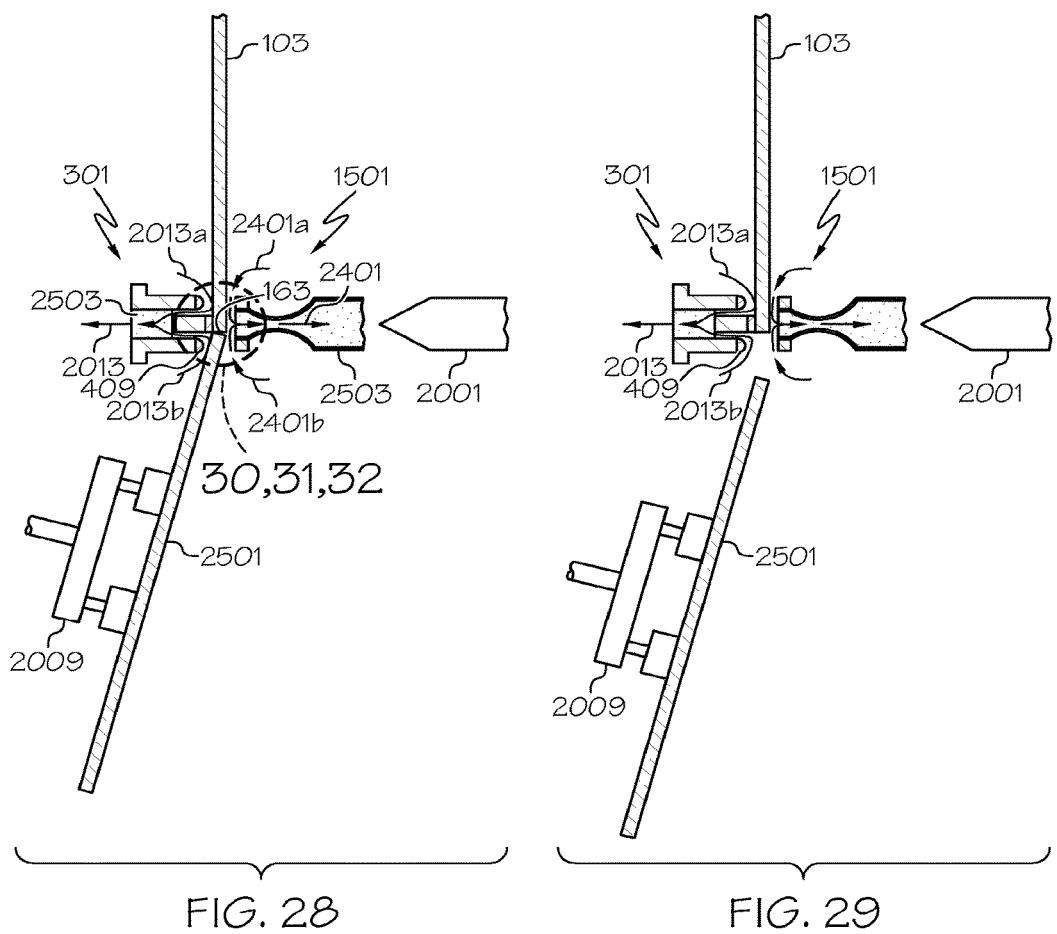

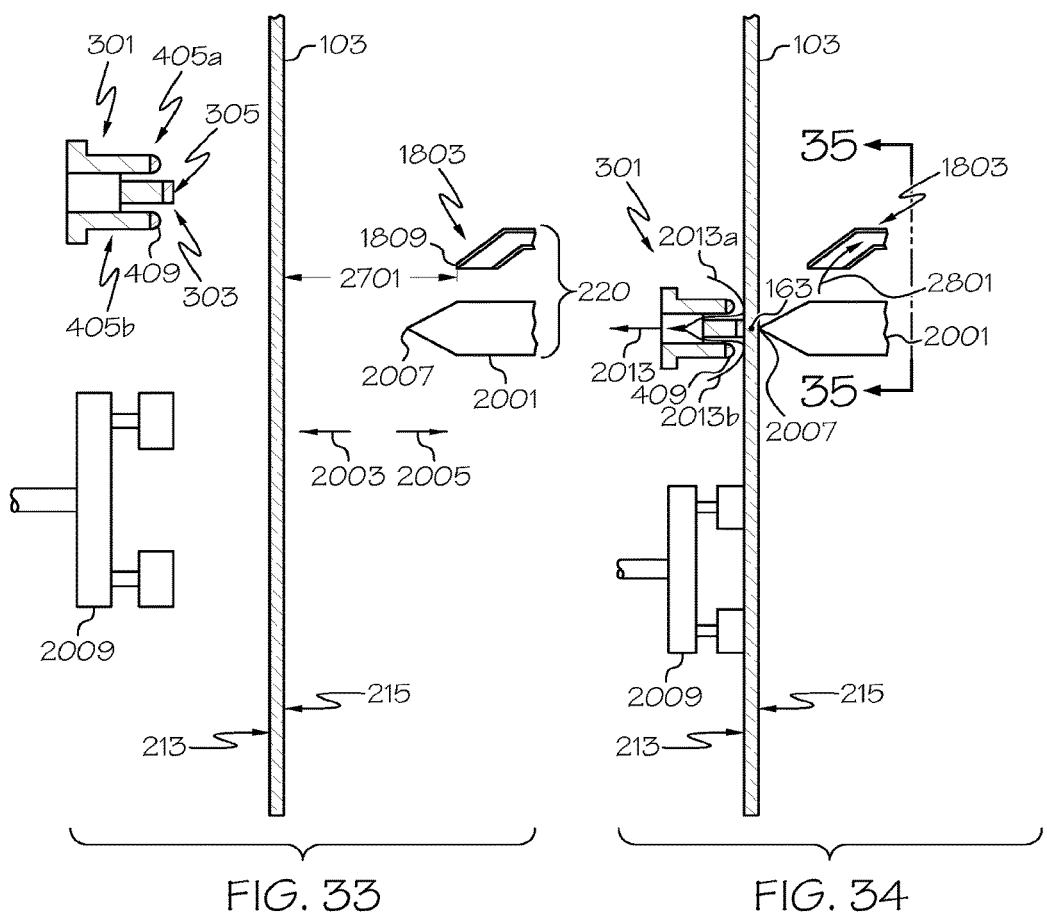

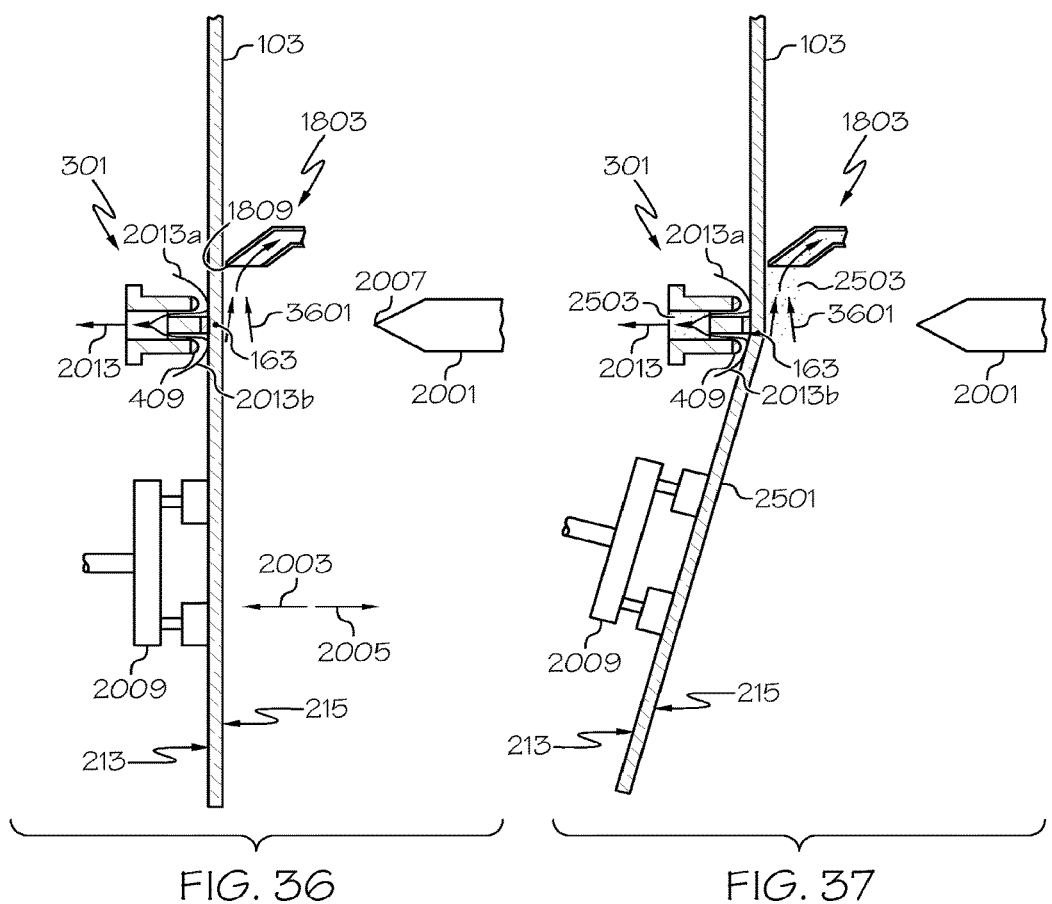

APPARATUS AND METHODS FOR SEPARATING A GLASS RIBBON

CROSS-REFERENCE TO RELATED APPLICATIONS

This application claims the benefit of priority under 35 U.S.C. § 365 of International Patent Application Serial No. PCT/US16/58992, filed on Oct. 27, 2016, which in turn claims the benefit of priority to U.S. Provisional Application Ser. No. 62/248,367 filed on Oct. 30, 2015, the content of each are relied upon and incorporated herein by reference in their entirety.

FIELD

The present disclosure relates generally to apparatus and methods for separating a glass ribbon and, more particularly, to apparatus and methods including at least one vacuum port configured to remove glass debris when separating a glass ribbon.

BACKGROUND

It is known to separate a sheet of glass from a glass ribbon. Typically, glass debris is generated during conventional separation techniques. Such debris can interfere with preservation of the pristine major surfaces of the glass ribbon. Such debris can also interfere with clean production of glass ribbon by contaminating the surrounding clean environment.

SUMMARY

The following presents a simplified summary of the disclosure in order to provide a basic understanding of some example aspects described in the detailed description.

In accordance with a first aspect, a glass manufacturing apparatus is configured to facilitate a process of separating a glass ribbon along a separation path extending across a width of the glass ribbon. The glass manufacturing apparatus comprises an elongated anvil member including an elongated support surface configured to engage a first major surface of the glass ribbon along the separation path. The glass manufacturing apparatus further comprises at least one elongated nose provided with an engagement device. The engagement device comprises at least one of a nonmetallic bumper and a roller recessed with respect to the elongated support surface of the elongated anvil member. The elongated nose and the elongated anvil member define at least one anvil-side vacuum port including an elongated length and a width extending perpendicular to the elongated length between the elongated nose and the elongated anvil member. The anvil-side vacuum port configured to remove glass debris during the process of separating the glass ribbon.

In one example of the first aspect, the engagement device is recessed a distance from the elongated support surface of the elongated anvil member within a range of from about 2 mm to about 20 mm.

In another example of the first aspect, the width of the anvil-side vacuum port is within a range of from about 1 mm to about 12 mm.

In still another example of the first aspect, the engagement device is removably attached to the elongated nose.

In yet another example of the first aspect, the engagement device comprises a resilient member configured to absorb energy from an impact. In one particular example, the resilient member comprises an elastomeric material.

In a further example of the first aspect, the engagement device comprises a roller configured to rotate about an axis. In one particular example, the roller is removably attached to the elongated nose. In another particular example, the roller comprises an elastomeric material. In still another particular example, the roller comprises a plurality of rollers. In yet another particular example, the plurality of rollers are disposed in series along a common axis.

In still another example of the first aspect, the at least one elongated nose includes a first elongated nose including an outer elongated surface recessed with respect to the elongated support surface of the elongated anvil member. The at least one elongated nose further includes a second elongated nose provided with the engagement device recessed with respect to the elongated support surface of the elongated anvil member. The elongated anvil member is disposed between the first elongated nose and the second elongated nose. The at least one anvil-side vacuum port includes a first anvil-side vacuum port defined by the first elongated nose and the elongated anvil member. The at least one anvil-side vacuum port further includes a second anvil-side vacuum port defined by the second elongated nose and the elongated anvil member. In one particular, the first anvil-side vacuum port includes a first width defined between the elongated anvil member and the first elongated nose and the second anvil-side vacuum port includes a second width defined between the elongated anvil member and the second elongated nose. In one example, the first width is different than the second width. In another example, the first width is substantially equal to the second width. In another particular example, a method is provided for separating a glass ribbon along a separation path extending across a width of the glass ribbon with the glass manufacturing apparatus of the example of the first aspect. The method comprises the step (I) of moving the elongated anvil member, the first elongated nose and the second elongated nose relative to the glass ribbon to engage the elongated support surface of the elongated anvil member with the first major surface of the glass ribbon along the separation path while the outer elongated surface of the first elongated nose and the engagement device are each spaced from the first major surface of the glass ribbon. The method further includes the step (II) of drawing fluid into the first anvil-side vacuum port to create a first fluid flow across the width of the glass ribbon, wherein the fluid flow is drawn along the first major surface of the glass ribbon in a direction toward the elongated anvil member. The method still further includes the step (III) of drawing fluid into the second anvil-side vacuum port to create a second fluid flow across the width of the glass ribbon, wherein the second fluid flow is drawn along the first major surface of the glass ribbon in a direction toward the elongated anvil member. The method further includes the step (IV) of bending the glass ribbon about the elongated anvil member to break a glass sheet from the glass ribbon along the separation path. The method also includes the step (V) of entraining glass debris generated during step (IV) into at least one of the first fluid flow and the second fluid flow. The method still further includes the step (VI) of drawing the first fluid flow into the first anvil-side vacuum port and drawing the second fluid flow into the second anvil-side vacuum port, wherein entrained glass debris is drawn into at least one of the first anvil-side vacuum port and the second anvil-side vacuum port. In one example, step (IV) includes bending the glass ribbon about the elongated anvil member until the engagement device engages the first major surface of the glass ribbon.

The first aspect can be provided alone or in combination with one or any combination of the examples of the first aspect discussed above.

In accordance with a second aspect, a method of separating a glass ribbon along a separation path extending across a width of the glass ribbon with the glass manufacturing apparatus of the first aspect is provided. The method includes the step (I) of moving the elongated anvil member and the elongated nose relative to the glass ribbon to engage the elongated support surface of the elongated anvil member with the first major surface of the glass ribbon along the separation path while the engagement device of the elongated nose is spaced from the first major surface of the glass ribbon. The method further includes the step (II) of drawing fluid into the anvil-side vacuum port to create a fluid flow across the width of the glass ribbon, wherein the fluid flow is drawn along the first major surface of the glass ribbon in a direction toward the elongated anvil member. The method still further includes the step (III) of bending the glass ribbon about the elongated anvil member to break a glass sheet from the glass ribbon along the separation path. The method also includes the step (IV) of entraining glass debris generated during step (III) into the fluid flow and the step (V) of drawing the fluid flow with entrained glass debris into the anvil-side vacuum port.

In one example of the second aspect, step (III) includes bending the glass ribbon about the elongated anvil member until the engagement device engages the first major surface of the glass ribbon.

The second aspect can be provided alone or in combination with one or any combination of the examples of the second aspect discussed above.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, aspects and advantages of the present disclosure can be further understood when read with reference to the accompanying drawings:

FIG. 11 is a plot comparing efficiency of various anvil-side apparatus with respect to particle size;

FIG. 12 is a cross-sectional view of an anvil-side apparatus in accordance with another example of the disclosure;

FIG. 13 is a cross-sectional schematic view of an anvil-side apparatus in accordance with still another example of the disclosure;

FIG. 14 is a front view of the anvil-side apparatus along line 14-14 of FIG. 13;

FIG. 26 illustrates another example step in the first method of separating a glass ribbon with the scoring device being moved away from the second major surface of the glass ribbon after completing the score line;

FIG. 27 illustrates another example step in the first method of separating a glass ribbon with the score-side vacuum device being moved toward a score line in the second major surface of the glass ribbon;

FIG. 28 illustrates another example step in the first method of separating a glass ribbon wherein a glass ribbon is separated along the score line;

FIG. 29 illustrates another example step in the first method of separating a glass ribbon wherein a glass sheet is moved away from the glass ribbon;

FIG. 33 illustrates an example step in a second method of separating a glass ribbon with an anvil-side apparatus spaced from a first major surface of the glass ribbon;

FIG. 34 illustrates another example step in the second method of separating a glass ribbon with the anvil-side apparatus being moved relative to the glass ribbon such that the elongated support surface of the elongated anvil member of the anvil-side apparatus engages the first major surface of the glass ribbon;

FIG. 36 illustrates another example step in the second method of separating the glass ribbon with the scoring device being moved away from the second major surface of the glass ribbon after completing the score line;

FIG. 37 illustrates another example step in the second method of separating the glass ribbon wherein a glass ribbon is separated along the score line.

DETAILED DESCRIPTION

Figure 1:
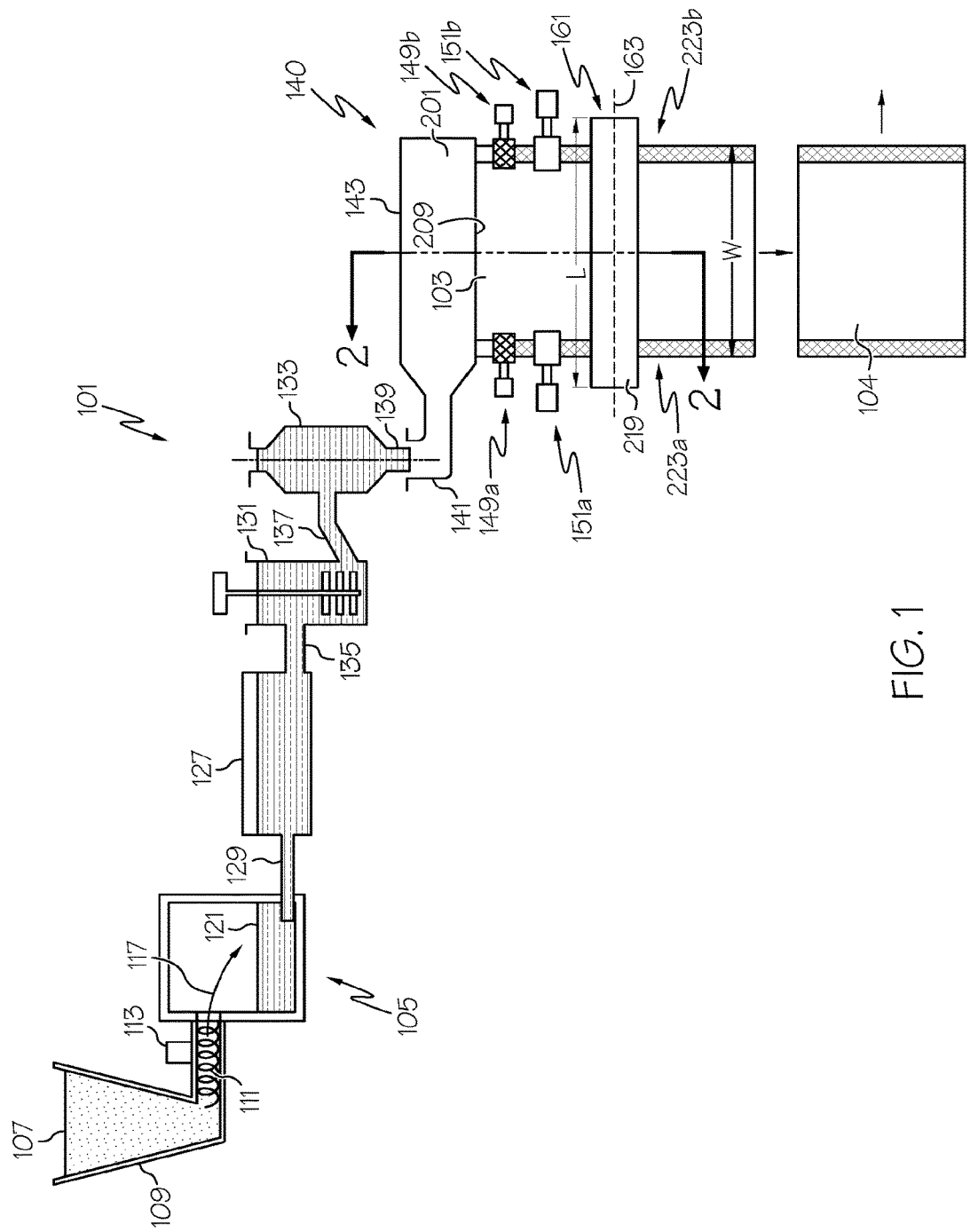
FIG. 1 schematically illustrates a glass manufacturing apparatus configured to facilitate a process of separating a glass ribbon along a separation path extending across a width of the glass ribbon.

Apparatus and methods will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Various glass manufacturing apparatus and methods of the disclosure may be used to produce a glass ribbon that may be further processed into one or more glass sheets. For instance, the glass manufacturing apparatus may be configured to produce a glass ribbon by a down-draw, up-draw, float, fusion, press rolling, slot draw, or other glass forming techniques.

The glass ribbon from any of these processes may be subsequently divided to provide sheet glass suitable for further processing into a desired display application. The glass sheets can be used in a wide range of display applications, for embodiment liquid crystal displays (LCDs), electrophoretic displays (EPD), organic light emitting diode displays (OLEDs), plasma display panels (PDPs), or the like.

FIG. 1 schematically illustrates an example glass manufacturing apparatus 101 configured to draw a glass ribbon 103. For illustration purposes, the glass manufacturing apparatus 101 is illustrated as a fusion down-draw apparatus although other glass manufacturing apparatus configured for up-draw, float, press rolling, slot draw, etc. may be provided in further examples. Moreover, as mentioned above, embodiments of the disclosure are not limited to producing glass ribbon. Indeed, the concepts presented in the present disclosure may be used in a wide range of glass manufacturing apparatus to produce a wide range of glass articles.

As illustrated, the glass manufacturing apparatus 101 can include a melting vessel 105 configured to receive batch material 107 from a storage bin 109. The batch material 107 can be introduced by a batch delivery device 111 powered by a motor 113. The motor 113 can introduce a desired amount of batch material 107 into the melting vessel 105, as indicated by arrow 117. The melting vessel 105 may then melt the batch material 107 into a quantity of molten material 121.

The glass manufacturing apparatus 101 can also include a fining vessel 127, for example a fining tube, located downstream from the melting vessel 105 and coupled to the melting vessel 105 by way of a first connecting tube 129. A mixing vessel 131, for example a stir chamber, can also be located downstream from the fining vessel 127 and a delivery vessel 133 may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, an optional delivery pipe 139 can be positioned to deliver molten material 121 from the delivery vessel 133 to a fusion draw machine 140. As discussed more fully below, the fusion draw machine 140 may be configured to draw the molten material 121 into the glass ribbon 103. In the illustrated embodiment, the fusion draw machine 140 can include a forming vessel 143 provided with an inlet 141 configured to receive molten material from the delivery vessel 133 either directly or indirectly, for example by the delivery pipe 139. If provided, the delivery pipe 139 can be configured to receive molten material from the delivery vessel 133 and the inlet 141 of the forming vessel 143 can be configured to receive molten material from the delivery pipe 139.

As shown, the melting vessel 105, fining vessel 127, mixing vessel 131, delivery vessel 133, and forming vessel 143 are examples of molten material stations that may be located in series along the glass manufacturing apparatus 101.

The melting vessel 105 and features of the forming vessel 143 are typically made from a refractory material, for example refractory ceramic (e.g. ceramic brick, ceramic monolithic forming body, etc.). The glass manufacturing apparatus 101 may further include components that are typically made from platinum or platinum-containing metals for example platinum-rhodium, platinum-iridium and combinations thereof, but which may also comprise other refractory metals for example molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the mixing vessel 131 (e.g., a stir chamber), the third connecting tube 137, the delivery vessel 133, the delivery pipe 139, the inlet 141 and features of the forming vessel 143.

Figure 2:
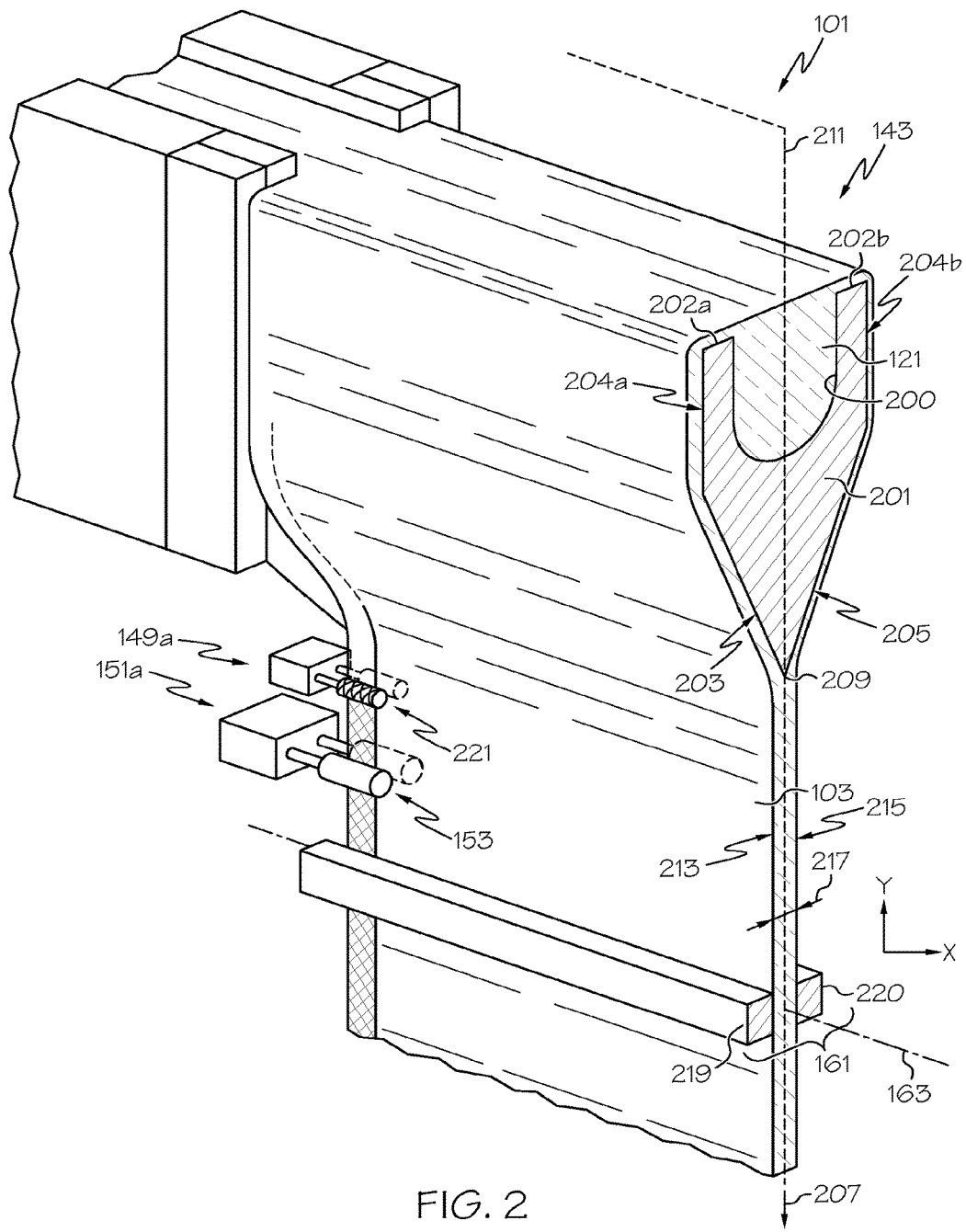
FIG. 2 is a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. As shown, the forming vessel 143 can include a trough 200 configured to receive the molten material 121 from the inlet 141. The forming vessel 143 further includes a forming wedge 201 comprising a pair of downwardly inclined converging surface portions 203, 205 extending between opposed ends of the forming wedge 201. The pair of downwardly inclined converging surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

Referring to FIG. 2, in one example, the molten material 121 can flow from the inlet 141 into the trough 200 of the forming vessel 143. The molten material 121 can then overflow from the trough 200 by simultaneously flowing over corresponding weirs 202a, 202b and downward over the outer surfaces 204a, 204b of the corresponding weirs 202a, 202b. Respective streams of molten material then flow along the downwardly inclined converging surface portions 203, 205 of the forming wedge 201 to be drawn off the root 209 of the forming vessel 143, where the flows converge and fuse into the glass ribbon 103. The glass ribbon 103 may then be drawn off the root 209 in the draw plane 211 along draw direction 207.

As shown in FIG. 2, the glass ribbon 103 may be drawn from the root 209 with a first major surface 213 and a second major surface 215. As shown, the first major surface 213 and the second major surface 215 face opposite directions with a thickness 217 that can be less than or equal to about 1 mm, for example, from about 50 µm to about 750 µm and all subranges therebetween, for example from about 100 µm to about 700 µm, for example from about 200 µm to about 600 µm, for example from about 300 µm to about 500 µm.

In some embodiments, glass manufacturing apparatus 101 for fusion drawing a glass ribbon can also include at least one edge roll assembly 149a, 149b. Each illustrated edge roll assembly 149a, 149b can include a pair of edge rolls 221 configured to provide proper finishing of the corresponding opposed edge portions 223a, 223b of the glass ribbon 103. In further examples, the glass manufacturing apparatus 101 can further include a first and second pull roll assembly 151a, 151b. Each illustrated pull roll assembly 151a, 151b can include a pair of pull rolls 153 configured to facilitate pulling of the glass ribbon 103 in the draw direction 207 of the draw plane 211.

As schematically shown in FIGS. 1 and 2, the glass manufacturing apparatus 101 can also include a glass separating apparatus 161 configured to facilitate a process of separating the glass ribbon 103 along a separation path 163 extending across a width "W" of the glass ribbon 103. The glass separating apparatus 161 may separate the glass ribbon along the separation path 163 into a glass sheet 104. In one example, after a sufficient length of glass ribbon 103 is drawn from the forming vessel 143, the glass separating apparatus 161 may operate to separate a glass sheet 104 from the remainder of the glass ribbon 103. In operation, the glass separating apparatus 161 may operate periodically to periodically separate respective glass sheets 104 from the glass ribbon 103 as the glass ribbon is drawn from the forming vessel.

In further examples, the glass ribbon 103 may be further processed (e.g., by adding electrical components, etc.) prior to operating the glass separating apparatus 161 to separate a processed glass sheet (e.g., a sheet including electrical components) from the remainder of the glass ribbon.

In addition or alternatively, in further examples, the glass ribbon 103 may be stored as a spool of glass ribbon. In such examples, the glass ribbon may be drawn from the forming vessel 143 and coiled into a spool of glass ribbon without further processing the glass ribbon before spooling the glass ribbon. In further examples, the glass ribbon may be further processed (e.g., by adding electrical components) prior to coiling the glass ribbon into a spool of glass ribbon. Once a sufficient amount of glass ribbon is spooled, the glass separating apparatus 161 may be operated to separate the spooled glass ribbon from the remainder of the glass ribbon being drawn from the forming vessel 143. In further examples, glass ribbon may eventually be unwound from the spool of glass ribbon. In such examples, the glass separating apparatus 161 may be used to separate a glass sheet from the glass ribbon as the ribbon is unwound from the spool of glass ribbon.

As shown schematically in FIG. 2, the glass separating apparatus 161 of the glass manufacturing apparatus 101 can include an anvil-side apparatus 219. As further illustrated in FIG. 2, the glass separating apparatus 161 of the glass manufacturing apparatus 101 can include a score-side apparatus 220. As further shown in FIG. 2, the glass separating apparatus 161 of the glass manufacturing apparatus 101 can include both the anvil-side apparatus 219 and the score-side apparatus 220 although further example glass manufacturing apparatus may include only one of the anvil-side apparatus 219 and the score-side apparatus 220 in accordance with aspects of the disclosure.

The anvil-side apparatus 219, if provided, may include various configurations in accordance with aspects of the disclosure. For instance, the anvil-side apparatus 219 may have any of the configurations illustrated in FIGS. 3-10 and 12-14 although alternative configurations may be provided in other examples. As illustrated in FIGS. 3-10 and 12-14, each anvil-side apparatus 301, 501, 601, 701, 801, 901, 1001, 1202 and 1302 can include an elongated anvil member 303 including an elongated support surface 305 configured to engage the first major surface 213 of the glass ribbon 103 along the separation path 163. As shown, each elongated anvil member 303 can be substantially identical to one another although the anvil-side apparatus may have different configurations in alternative examples. As such, the elongated anvil member 303 will be discussed with respect to the example illustrated in FIG. 3 with the understanding that similar or identical features may also be optionally found in any of the elongated anvil members discussed throughout the application. Moreover, unless otherwise stated any feature of any of the anvil-side apparatus 301, 501, 601, 701, 801, 901, 1001, 1202 and 1302 may apply to any of the other anvil-side apparatus of the disclosure.

Figure 3:
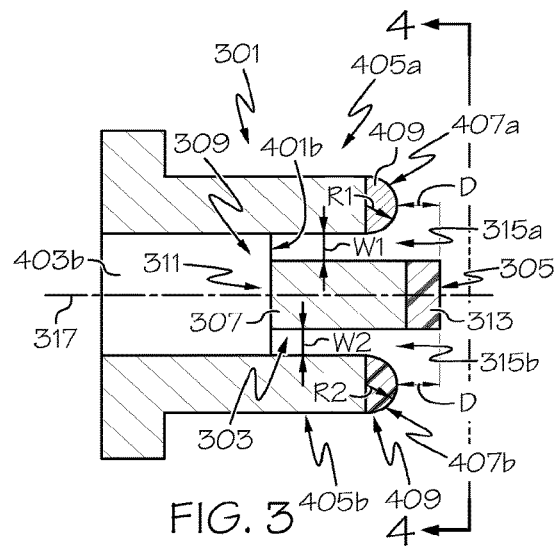
FIG. 3 is a cross-sectional view of an anvil-side apparatus in accordance with one example of the disclosure.
Figure 4:
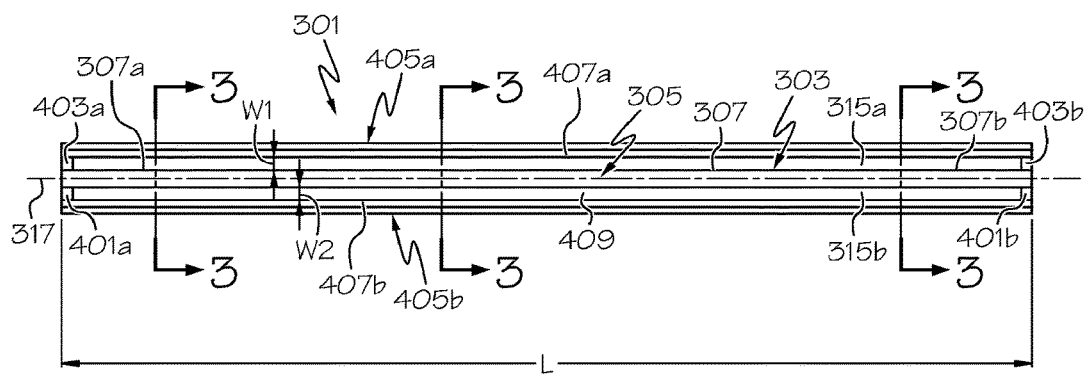
FIG. 4 is a front view of the anvil-side apparatus along line 4-4 of FIG. 3.

With reference to FIG. 3, for example, the elongated anvil member 303 can comprise a relatively rigid base 307, such as a metal bar. In just one example, as shown in FIG. 4, respective outer ends 307a, 307b of the rigid base 307 can extend over respective outer facing edges 401a, 401b of corresponding lateral sides 403a, 403b of the anvil-side apparatus 301. In such a manner, the elongated anvil member 303 can span across an open central area 309 that can extend immediately upstream from the central rear surface 311 of the elongated anvil member 303 and, except for the elongated anvil member 303, the open central area 309 can span uninterrupted between the corresponding lateral sides 403a, 403b. As illustrated, in some examples, fluid flow can thereby freely pass through the uninterrupted open central area 309 to be divided into separate elongated paths passing on either side of the elongated anvil member 303. At the same time, the relatively rigid nature of the elongated anvil member 303 can resist bending of the elongated anvil member 303 while applying pressure with the elongated support surface 305 against the first major surface 213 of the glass ribbon 103.

In one example, the elongated anvil member 303 can include an outer engagement member 313 at an end of the rigid base 307. The outer engagement member 313 can provide the elongated support surface 305 and may comprise a rubber or polymeric material that can promote sufficient support while minimizing, such as preventing, scratching or other damage to the first major surface 213 of the glass ribbon 103. In some examples, the elongated support surface 305 can comprise a substantially planar surface although arcuate or other surface configurations may be provided in further examples.

As shown in FIGS. 1 and 4, any of the elongated anvil members of the disclosure can include an elongated length "L" that may be greater than the width "W" of the glass ribbon 103 although the elongated length may extend less than or equal to the width in further examples. While various lengths may be used, providing an elongated length "L" that is at least equal to or greater than (see FIG. 1) than the width "W" of the glass ribbon can permit support of the glass ribbon across the entire width "W" of the glass ribbon 103.

Each anvil-side apparatus can include at least one elongated nose including an outer elongated surface recessed with respect to the elongated support surface of the elongated anvil member. For example, as shown in FIGS. 3-10 and 12-14, each anvil-side apparatus can include two elongated noses that are offset from one another although a single elongated nose may be provided in further examples.

Examples of the at least one nose, such as the two elongated noses will be described with reference to FIGS. 3 and 4 with the understanding that similar or identical features may apply to the at least one elongated nose of any of the anvil-side apparatus of the disclosure. Referring to FIGS. 3 and 4, the anvil-side apparatus 301 can comprise a first elongated nose 405a including a first outer elongated surface 407a laterally recessed a distance "D" with respect to the elongated support surface 305 of the elongated anvil member 303. Optionally, the anvil-side apparatus 301 (and any anvil-side apparatus of the disclosure) can comprise a second elongated nose 405b including a second outer elongated surface 407b laterally recessed a distance "D" with respect to the elongated support surface 305 of the elongated anvil member 303. Providing a second nose can help develop two velocity fluid flow profiles on each side of the elongated anvil member to help remove glass debris during the process of separating the glass ribbon.

Optionally, as shown in FIGS. 6-9, a cross-sectional profile of the first elongated nose 405a may be a substantial mirror image of a cross-sectional profile of the second elongated nose 405b about a central plane 317 bisecting the elongated anvil member 303. As shown, some examples provide the central plane 317 also extending perpendicular to the elongated support surface 305. In contrast, further examples include the first elongated nose that is not a substantial mirror image of the second elongated nose as shown in FIGS. 3-5, 10 and 12-14. Providing noses that are mirror images of one another can help develop substantially similar or identical fluid profiles on each side of the elongated anvil member 303 to allow equal opportunities to trap glass debris on both sides of the elongated anvil member 303. Providing noses that are not mirror images of one another can, in some examples, help target a fluid profile to a side of the elongated anvil member 303 that has a higher probability of encountering glass debris when compared to the other side of the elongated anvil member. In further examples, the noses may be adjustable to adjust the recessed distance "D", thereby enabling the fluid flow to be adjusted without the need to replace the entire anvil-side apparatus.

The recessed distance "D" illustrated in FIGS. 3, 5-10, 12 and 13 of the various anvil-side apparatus may be different from one another depending on the particular application. Moreover, if the anvil-side apparatus includes two noses, the recessed distance "D" of each nose may be the same (as shown in FIGS. 3, 5-10, 12 and 13) or different from another depending on the application. In some examples, the above-referenced distance "D" can be within a range of from about 2 mm to about 20 mm, such as from about 2 mm to about 15 mm, such as from about 3 mm to about 10 mm, such as from about 3 mm to about 8 mm, such as from about 4 mm to about 6 mm. The distance "D" can be selected to be large enough to promote development of fluid flow for capture of glass debris and can also provide desirable pressure drop (e.g., by suction and/or Bernoulli effect) pulling the first major surface 213 of the glass ribbon 103 against the elongated support surface 305.

As shown by example in FIGS. 3-5 and 12-14, any elongated nose of any of the example anvil-side apparatus can include an engagement device 409 configured to minimize damage to the first major surface 213 of the glass ribbon 103 in the unlikely event that the glass ribbon 103 contacts the engagement device 409. The engagement device 409 may comprise a resilient member, thereby acting as a shock absorber that can absorb energy. In one example, the engagement device 409 may be integrated with the elongated nose. In other examples, the engagement device 409 may be removably attached to the elongated nose, thereby promoting efficiency by way of decreasing machine down time if the engagement device 409 requires maintenance or replacing.

In one example, as shown in FIGS. 3 and 4, the engagement device 409 may comprise a bumper. The bumper may comprise a non-metallic material, such as an elastomeric material (e.g., silicone, Viton® material, Torlon® material). As shown the bumper may have an entirely solid cross section. In another example, as shown in FIG. 12, the engagement device 409 may comprise a bumper having a hollow region 1204, for example, the engagement device may comprise an O-ring. The cross section of the bumper may comprise a semicircular shape 1206 although other shapes may be provided in further examples (e.g., triangle, square, rectangle shape). In further examples, the engagement device 409 may be configured to be attached (e.g., removably attached) to the elongated nose 405b. For example, as shown in FIG. 12, the engagement device 409 may include an elongated attachment tongue 1210a configured to be received within an elongated attachment groove 1210b of the elongated nose 405b. In further examples, although not shown, the engagement device may have an elongated groove configured to receive an elongated attachment tongue of the elongated nose.

In another example, as shown in FIG. 13, the engagement device 409 may comprise a roller 1304a, 1304b configured to rotate about an axis. In one example, the roller 1304a may comprise a metal material, such as steel. In another example, as alternatively shown, the engagement device 409 may comprise a non-metallic roller 1304b, for example, the non-metallic roller 1304b may comprise an elastomeric material (e.g., silicone, Viton® material, Torlon® material). The roller may have a diameter within a range of from about 6 mm to about 10 mm.

As shown, the roller is rotatably mounted in place by a shaft 1306. The shaft 1306 is received by a bore 1308 in the roller. In one example, the diameter of the bore 1308 may be larger than the diameter of the shaft 1306 thereby allowing the roller to freely rotate about an axis. In other examples, the roller 1304a, 1304b may include a bearing to promote a consistent rotational path, while not inducing increased friction between the bore 1308 and the shaft 1306. The shaft 1306 may be fixed to an inside wall 1310 of the elongated nose 405b thereby limiting horizontal movement of the roller along the axis. In another example, the shaft 1306 may be removably attached to the elongated nose by way of a slot (not shown). In yet another example, the roller may be biased to an outer position by a spring 1312. The optional spring promotes resiliency of the roller, thereby allowing the roller to absorb an impact.

In yet another example, as shown in FIG. 14, the engagement device 409 may comprise a plurality of engagement devices 409 that are disposed in series along a common axis. The engagement devices 409 may be laterally displaced a distance of less than 100 mm from one another. For example, the engagement device 409 may comprise a plurality of non-metallic bumpers; the plurality of non-metallic bumpers may or may not be hollow. For example, the engagement device may consist of a mix of hollow and solid non-metallic bumpers.

In yet another example, the engagement device 409 may comprise a plurality of rollers. The lateral width of a roller (i.e., width along the axis) may be equal to one half of the roller's diameter. Alternatively, the lateral width of a roller may be equal to the roller's diameter. In still another alternative example, the lateral width of a roller may be equal to a width within a range of from about one half the roller's diameter to about the diameter of the roller. In one example, the plurality of rollers may have the same lateral and circumferential dimensions; alternatively, the plurality of rollers may have different lateral and circumferential dimensions.

In a further example, the plurality of rollers may comprise a plurality of metallic rollers 1304a. In another example, the plurality of rollers may comprise a plurality of non-metallic rollers 1304b. In a further example, the engagement device 409 may comprise a mix of metallic and non-metallic rollers. In yet a further example, the engagement device 409 may comprise a mix of non-metallic bumpers and rollers. In still another example, the engagement device 409 may comprise a mix of non-metallic bumpers and non-metallic rollers. In still a further example, the engagement device 409 may comprise a mix of non-metallic bumpers, non-metallic rollers, and metallic rollers.

As further shown by the example of FIG. 4, any elongated nose can extend along a substantial portion, such as the entire, elongated length "L" of the elongated anvil member 303. Indeed, as shown in FIG. 4, the first elongated nose 405a and the second elongated nose 405b can extend along the entire length "L" of the elongated anvil member 303. Moreover, the first elongated nose and the second elongated nose can be provided with a substantially consistent cross-sectional profile along a substantial, if not the entire, elongated length as demonstrated by the multiple cross-sections 3-3 in FIG. 4 that appear identical as shown in FIG. 3. Providing the elongated nose extending along the entire length with a substantially consistent cross-sectional profile can promote development of a consistent fluid flow along the width "W" of the glass ribbon 103 for capture of glass debris and can also provide desirable suction force pulling the first major surface 213 of the glass ribbon 103 against the elongated support surface 305.

As further shown in FIGS. 3-10 and 12-14, each anvil-side apparatus 301, 501, 601, 701, 801, 901, 1001, 1202 and 1302 can also include at least one anvil-side vacuum port 315a, 315b. For example, as shown in FIGS. 3-10, each anvil-side apparatus can include a first anvil-side vacuum port 315a and a second anvil-side vacuum port 315b although a single or three or more anvil-side vacuum ports may be provided in further examples. A single anvil-side vacuum port may be provided to remove a significant amount of glass debris during the process of separating the glass ribbon while the elongated support surface 305 engages the first major surface 213 of the glass ribbon 103. However, providing two or more anvil-side vacuum ports may further capture glass debris developed on both sides of the elongated anvil member 303. Indeed, as shown the elongated anvil member 303 is disposed between the first elongated nose 405a and the second elongated nose 405b. As such, the at least one anvil-side vacuum port can include the first anvil-side vacuum port 315a defined by the first elongated nose 405a and the elongated anvil member 303 and the second anvil-side vacuum port 315b defined by the second elongated nose 405b and the elongated anvil member 303.

Examples of the at least one anvil-side vacuum port will be described with reference to FIGS. 3 and 4 with the understanding that similar or identical features may apply to the at least one anvil-side vacuum ports of any of the anvil-side apparatus of the disclosure.

As shown in FIG. 4, each anvil-side vacuum port can include an elongated length substantially equal to the previously-described elongated length "L" of the elongated anvil member 303. Each anvil-side vacuum port can also include a width extending perpendicular to the elongated length between the elongated nose and the elongated anvil member. For example, as shown in FIGS. 3 and 4, the first anvil-side vacuum port 315a includes a first width "W1" extending perpendicular to the elongated length and defined between the first elongated nose 405a and the elongated anvil member 303. As further shown in FIGS. 3 and 4, the second anvil-side vacuum port 315b includes a second width "W2" extending perpendicular to the elongated length and defined between the first elongated nose 405a and the elongated anvil member 303.

Figure 5:
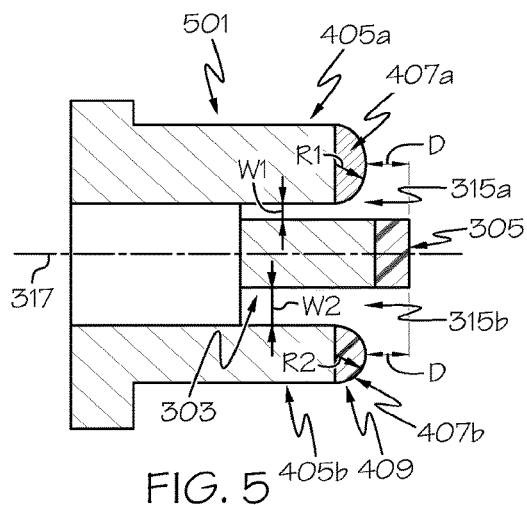
FIG. 5 is a cross-sectional view of an anvil-side apparatus in accordance with another example of the disclosure.

As shown in FIGS. 3-4, and 6-10, the first width "W1" can be substantially equal to the second width "W2" to allow development of substantially equal fluid velocity profiles on each side of the elongated anvil member 303. Any of the anvil-side apparatus of the disclosure can also (or alternatively) include a first width "W1" that is different than the second width "W2". For example, the first width "W1" may be greater than the second width "W2". Alternatively, as shown in FIG. 5, the first width "W1" may be less than the second width "W2". Providing different widths can help tune the overall velocity profile by providing different velocity profiles on each side of the elongated anvil member 303.

Various example widths "W1" and/or "W2" may be provided within a desired range of widths. For example, one or both of the widths "W1" and "W2" of the at least one anvil side vacuum port can be within a range of from about 1 mm to about 12 mm, such as from about 1 mm to about 10 mm, such as from about 2 mm to about 8 mm, such as from about 3 mm to about 8 mm, such as from about 4 mm to about 6 mm.

In some examples, the outer elongated surface of the elongated nose can comprise a convex surface. For instance, as shown in FIG. 3, the first outer elongated surface 407a of the first elongated nose 405a can comprise the illustrated first convex surface including a first radius "R1". The second outer elongated surface 407b of the second elongated nose 405b can also comprise the illustrated second convex surface including a second radius "R2". In some examples, the first radius and second radius can be approximately half the width of the respective elongated nose.

Figure 6:
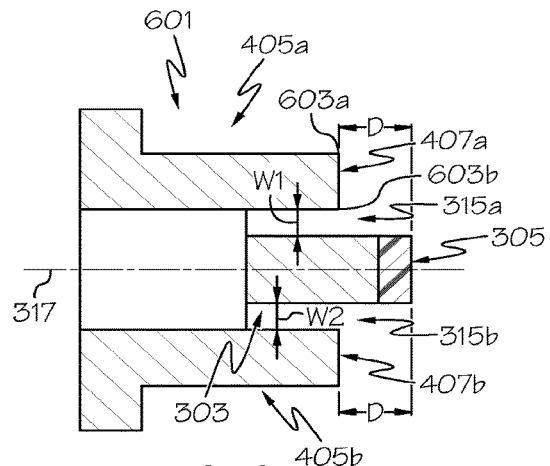
FIG. 6 is a cross-sectional view of an anvil-side apparatus in accordance with still another example of the disclosure.

The anvil-side apparatus 601 of FIG. 6 illustrates an example where the outer elongated surface 407a, 407b of the elongated nose 405a, 405b comprises a substantially planar surface. As shown, the substantially planar surface can optionally include outer relatively sharp outer and inner corners 603a, 603b although rounded corners may be provided in further examples.

Figure 9:
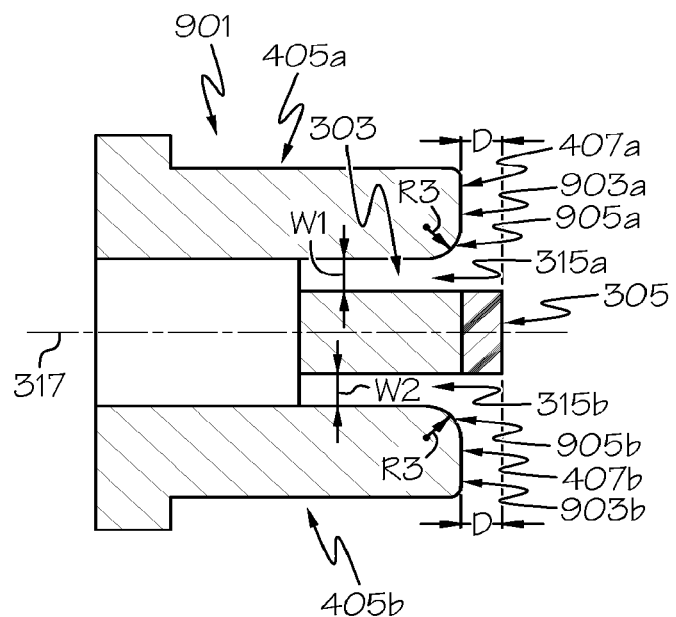
FIG. 9 is a cross-sectional view of an anvil-side apparatus in accordance with still a further example of the disclosure.

The anvil-side apparatus 901 of FIG. 9 illustrates the outer elongated surface 407a, 407b of the elongated nose 405a, 405b including a planar surface 903a, 903b and an inner convex surface 905a, 905b at an inner edge of the substantially planar surface 903a, 903b that at least partially defines the anvil-side vacuum port 315a, 315b. In some examples, the inner convex surface 905a, 905b includes a radius "R3" within a range of from about 1 mm to about 10 mm, such as from about 1 mm to about 8 mm, such as from about 2 mm to about 8 mm, such as from about 2 mm to about 7 mm, such as from about 3 mm to about 7 mm, such as from about 4 mm to about 6 mm.

Figure 10:
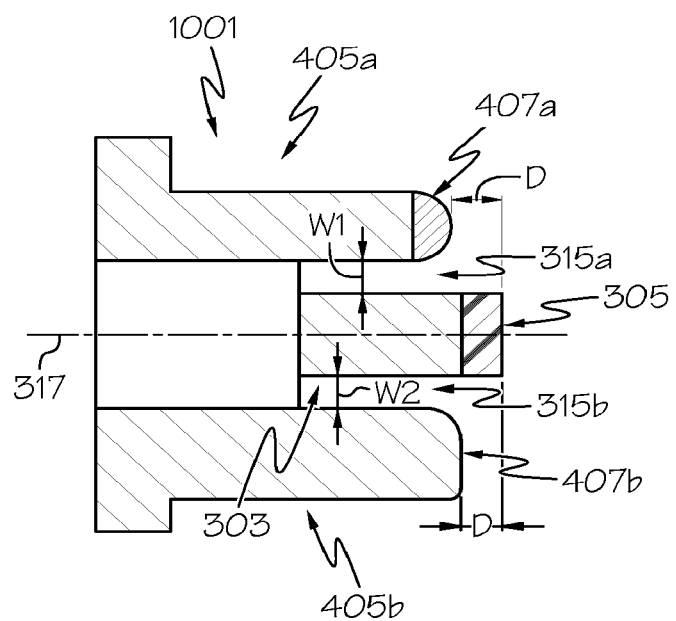
FIG. 10 is a cross-sectional view of an anvil-side apparatus in accordance with yet a further example of the disclosure.

The anvil-side apparatus 1001 of FIG. 10 illustrates a hybrid between the configurations of FIGS. 3-5 and either FIG. 6 or FIG. 9. Indeed, one of the first and second outer elongated surface 407a, 407b can comprise the convex surface illustrated in FIGS. 3-5 while the other upper the outer elongated surface of the elongated nose can comprise substantially planar surface (e.g., as shown in FIG. 6 or 9). Indeed, as shown in FIG. 10, the first outer elongated surface 407a of the first elongated nose 405a comprises a convex surface that may be similar or identical to any of the convex surfaces of the elongated noses of FIGS. 3-5 while the second outer elongated surface 407b of the second elongated nose 405b comprises a substantially planar surface and inner convex surface similar or identical to the outer elongated surface shown in FIG. 9.

Figure 7:
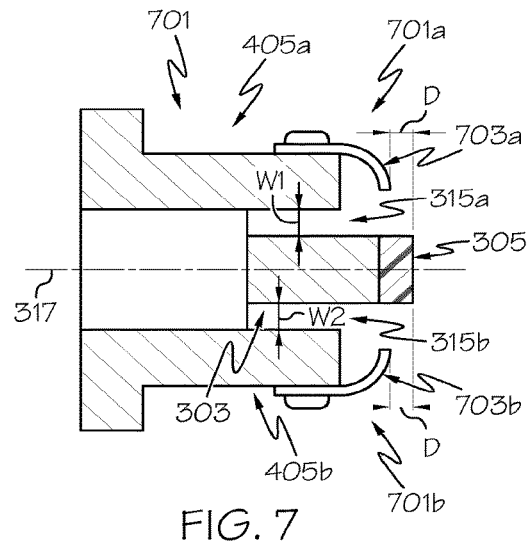
FIG. 7 is a cross-sectional view of an anvil-side apparatus in accordance with yet another example of the disclosure.
Figure 8:
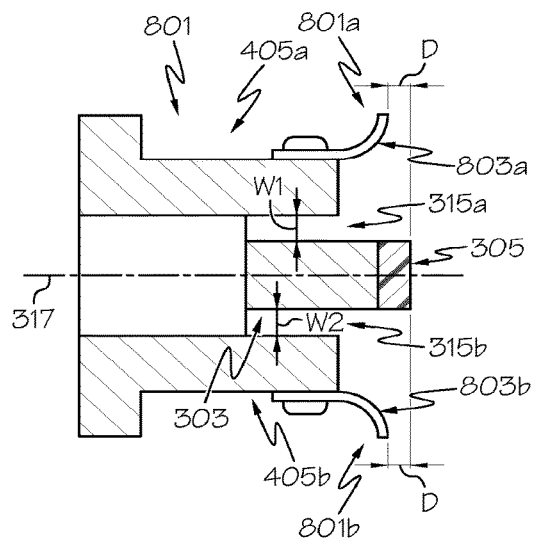
FIG. 8 is a cross-sectional view of an anvil-side apparatus in accordance with a further example of the disclosure.

FIGS. 7 and 8 illustrate example anvil-side apparatus 701, 801 wherein the at least one elongated nose includes a wing defining convex surface. For example, with reference to FIG. 7, the at least one elongated nose 405a, 405b includes a wing 701a, 701b defining the respective convex surfaces 703a, 703b that face outwardly with respect to the elongated anvil member 303. In another example, as shown in FIG. 8, the at least one elongated nose 405a, 405b includes a wing 801a, 801b defining respective convex surfaces 803a, 803b that face inwardly with respect to the elongated anvil member 303.

As mentioned previously, the glass manufacturing apparatus can include the score-side apparatus 220 illustrated schematically in FIG. 2 associated with the second major surface 215 of the glass ribbon 103. As further illustrated schematically in FIG. 23, the score-side apparatus 220 can include a scoring device 2001 configured to move in opposite directions 2003, 2005 between a retracted position (e.g., see FIG. 23) with a scoring element 2007 spaced from the second major surface 215 of the glass ribbon 103 and the extended position (e.g., see FIG. 24) with the scoring element 2007 engaging the second major surface 215 of the glass ribbon 103. In some examples, the opposite directions 2003, 2005 are substantially perpendicular to the second major surface 215 although the opposite directions 2003, 2005 may extend at other angles in further examples. The scoring device 2001 may comprise a mechanical scribe wherein the scoring element 2007 comprises a scoring wheel, sharp tip, or other element configured to score the second major surface 215 of the glass ribbon 103.

Figure 15:
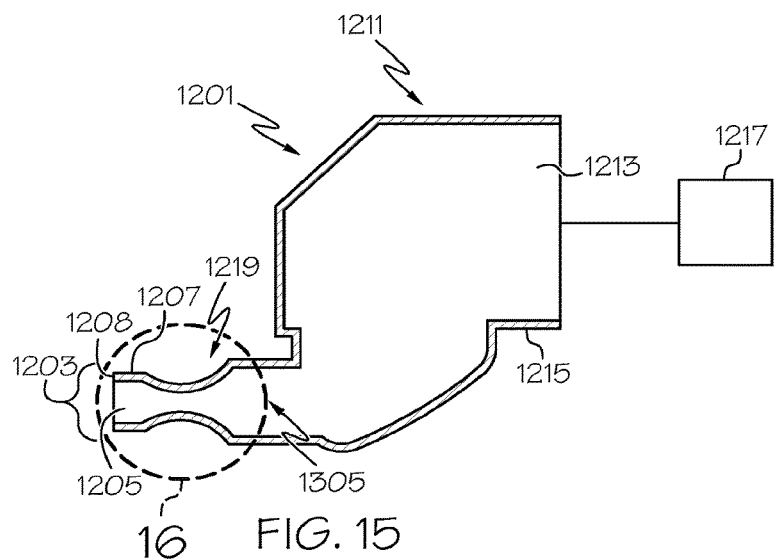
FIG. 15 is a cross-sectional view of a score-side vacuum device in accordance with an example of the disclosure.
Figure 17:
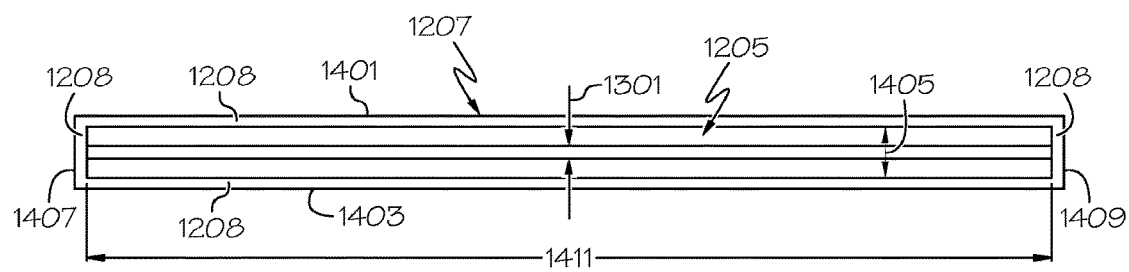
FIG. 17 is a front view of the example score-side vacuum device along line 17-17 of FIG. 16.

The score-side apparatus 220 can also include a score-side vacuum port that may include any one of a wide range of configurations. For instance, as illustrated in FIG. 15, a vacuum device 1201 may be provided that includes the score-side vacuum port 1203. For purposes of the disclosure, the score-side vacuum port is considered the entrance opening 1205 for fluid flowing into the vacuum device 1201 as well as features associated with the entrance opening 1205 that impacts the velocity profile of the fluid entering the entrance opening 1205. For example, the score-side vacuum port 1203 of the vacuum device 1201 of FIG. 15 includes the entrance opening 1205 as well as the illustrated outer wall portion 1207 and outer edge 1208 of the outer wall portion 1207. As shown in FIG. 17, the outer wall portion 1207 may be shaped as a rectangular outer wall portion 1207 with a pair of elongated walls 1401, 1403 spaced apart by a width 1405 of the entrance opening 1205 and a pair of lateral walls 1407, 1409 spaced apart by an elongated length 1411 of the entrance opening 1205. In the illustrated example, the width 1405 extends perpendicular to the elongated length 1411 of the score-side vacuum port 1203. As discussed below, score-side vacuum port 1203 is configured to remove glass debris generated during the process of separating the glass ribbon 103. In some examples, the width 1405 can be from about 10 mm to about 80 mm, such as from about 20 mm to about 40 mm, such as from about 24 mm to about 30 mm.

Figure 16:
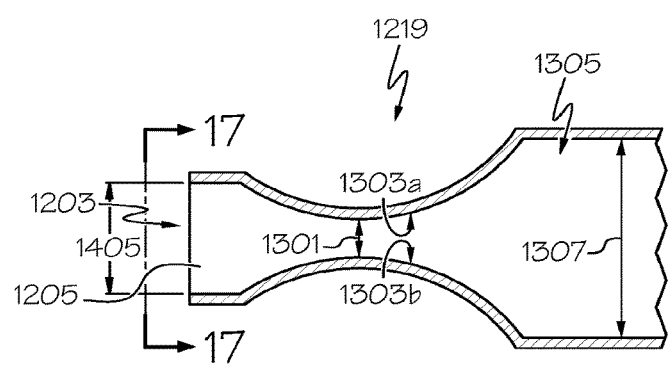
FIG. 16 is an enlarged portion of the score-side vacuum device taken at view 16 of FIG. 15.

The vacuum device 1201 can also include a housing 1211 with an interior cavity 1213 with an upstream portion 1215 configured to be operably connected to a vacuum source 1217 as schematically shown in FIG. 15. Optionally, the vacuum device 1201 can further comprise a flow restrictor 1219. The flow restrictor 1219 can help restrict the flow of fluid passing from the entrance opening 1205 to the interior cavity 1213, thereby facilitating a consistent and even flow of fluid through the entrance opening 1205 along the elongated length 1411 of the score-side vacuum port 1203. The flow restrictor 1219 includes an elongated length that may be identical to the elongated length 1411 of the score-side vacuum port 1203. As further illustrated in FIG. 16, the flow restrictor 1219 can also include a restriction width 1301 extending perpendicular to the elongated length 1411 of the flow restrictor 1219. As shown in FIG. 16, the restriction width 1301 of the flow restrictor is less than the width 1405 of the score-side vacuum port 1203.

As further shown in FIG. 16, the flow restrictor can comprise a pair of facing arcuate convex surfaces 1303a, 1303b providing a smooth transition between a width 1307 of an upstream channel 1305 and the width 1405 of the entrance opening 1205 of the score-side vacuum port 1203. The smooth transition can avoid eddying, turbulence or other fluid flow interruptions that may interfere with the consistent and even fluid flow. Like the flow restrictor 1219, the upstream channel 1305 can include an elongated length that may be identical to the elongated length 1411 of the entrance opening 1205 of the score-side vacuum port 1203. Moreover, as shown, the width 1307 of the upstream channel 1305 can be greater than the width 1405 of the entrance opening 1205 of the score-side vacuum port 1203. Consequently, a pressure drop may exist between the upstream channel 1305 and the entrance opening 1205 that extends along the elongated length 1411 of the flow restrictor to promote consistent and even fluid flow along the elongated length 1411 of the entrance opening 1205 of the score-side vacuum port 1203.

Figure 20:
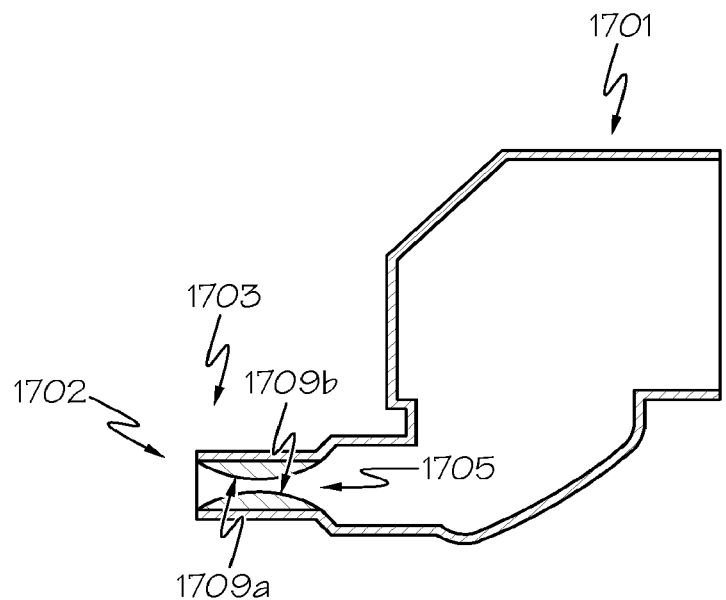
FIG. 20 is a cross-sectional view of a score-side vacuum device in accordance with yet another example of the disclosure.

As shown, in FIG. 16, opposed walls of the vacuum device 1201 may be shaped to define the flow restrictor 1209. For instance, as shown, the opposed walls comprise curved walls that define the facing arcuate convex surfaces 1303a, 1303b. Alternatively, FIG. 20 illustrates a vacuum device 1701 that, unless otherwise noted, can be similar or identical to the vacuum device 1201 shown in FIGS. 15-16. However, to simplify manufacture and versatility, the vacuum device 1701 may include a flow restrictor 1703 including an adaptor 1705 formed as an insert to provide the desired facing arcuate convex surfaces 1709a, 1709b. Providing the flow restrictor 1703 with the adaptor 1705 can simplify fabrication of the vacuum device 1701 since substantially straight walls may be substituted for the curved walls of the flow restrictor 1209 shown in FIG. 15. Moreover, alternative flow restrictor configurations may be inserted to provide different fluid flow characteristics without replacing the entire vacuum device.

Figure 18:
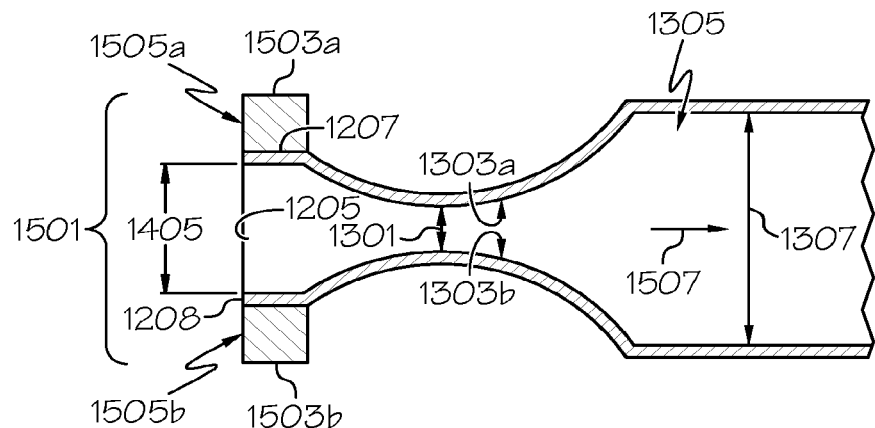
FIG. 18 is a cross-sectional view of a score-side vacuum device in accordance with another example of the disclosure.
Figure 19:
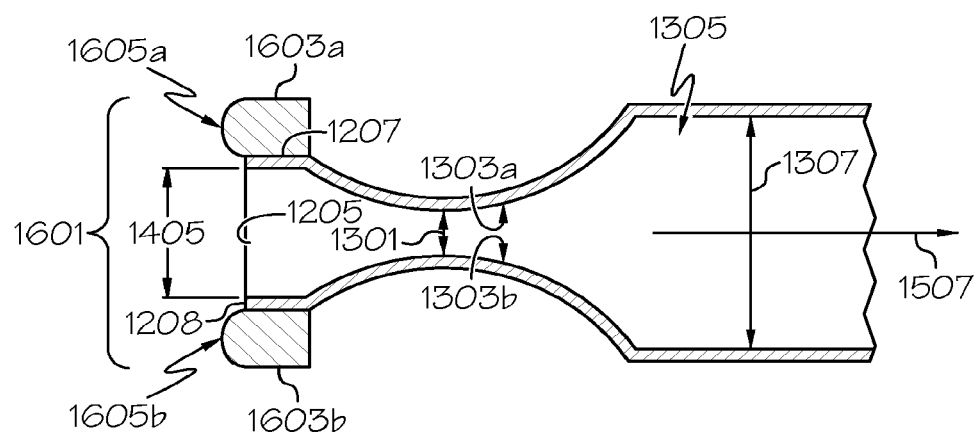
FIG. 19 is a cross-sectional view of a score-side vacuum device in accordance with still another example of the disclosure.

FIGS. 18 and 19 illustrate respective further example score-side vacuum ports 1501, 1601 that, unless otherwise noted, can be similar or identical to the vacuum the score-side vacuum port 1203 illustrated in FIGS. 15-17. As illustrated in FIG. 18, optionally, the score-side vacuum port 1501 can also be at least partially defined by a pair of score-side noses 1503a, 1503b that are spaced apart in a direction of the width 1405 of the entrance opening 1205 of the score-side vacuum port 1501. In another example, as shown in FIG. 19, the score-side vacuum port 1601 includes a pair of score-side noses 1603a, 1603b that are spaced apart in a direction of the width 1405 of the entrance opening 1205 of the score-side vacuum port 1601.

In some examples, one or both of the outer elongated surfaces can comprise a substantially planar surface. For instance, as shown in FIG. 18, each of the pair of score-side noses 1503a, 1503b includes an elongated surface 1505a, 1505b comprising the illustrated planar surface. As further illustrated, each elongated surface 1505a, 1505b may be flush with outer edge 1208 of the outer wall portion 1207 although the planar surfaces may extend upstream or downstream in a direction 1507 of the fluid flow from the outer edge 1208 in further examples.

In some examples, one or both of the outer elongated surfaces can comprise a convex surface. For instance, as shown in FIG. 19, each of the pair of score-side noses 1603a, 1603b includes an elongated surface 1605a, 1605b comprising the illustrated convex surface. As further illustrated, each elongated surface 1605a, 1605b may protrude upstream from the outer edge 1208 of the outer wall portion 1207 although the apex of the convex surface may be flush with the outer edge 1208 or positioned downstream in a direction 1507 with respect to the outer edge 1208 in further examples.

Figure 21:
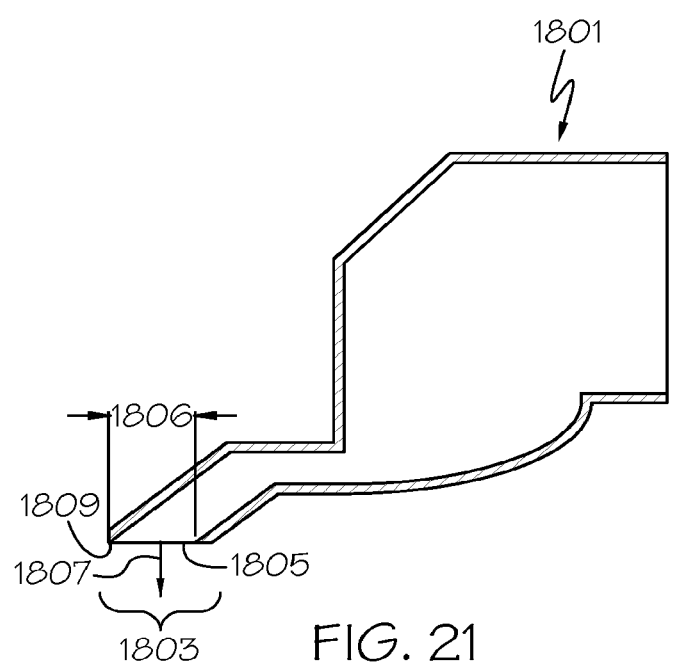
FIG. 21 is a cross-sectional view of a score-side vacuum device in accordance with a further example of the disclosure.

FIG. 21 illustrates yet another example of a vacuum device 1801 that, unless otherwise noted, can be similar or identical to the vacuum device 1201 shown in FIGS. 15-16. As illustrated, the vacuum device 1801 can include a score-side vacuum port 1803 with an opening 1805 configured to face in a direction 1807 that may be parallel to the glass ribbon. The opening 1805 can include a width 1806 that may be within a range of from about 10 mm to about 50 mm, such as from about 25 mm to about 40 mm although other widths may be provided in further examples. Moreover, as illustrated, the opening 1805 can extend substantially all the way to the outermost tip 1809 positioned closer to the glass ribbon than any other portion of the vacuum device 1801. Providing the illustrated opening that extends all the way to the outermost tip 1809 can allow close positioning of the opening 1805 to the glass ribbon 103, thereby facilitating development of a fluid flow pattern that can effectively entrain and carry away glass debris during separation of a glass sheet from the glass ribbon.

Methods of separating the glass ribbon 103 along the separation path 163 extending across the width "W" of the glass ribbon 103 will now be described with reference to the methods schematically illustrated in FIGS. 26-38. Methods of the disclosure may be carried out with method steps involving the anvil-side apparatus 219 without involving steps associated with the score-side apparatus 220. In further examples, the methods may be carried out with method steps involving the score-side apparatus 220 without involving steps associated with the anvil-side apparatus 219. In still further examples, methods may be carried out with method steps involving both the anvil-side apparatus 219 and the score-side apparatus 220.

Methods of FIGS. 23-38 (e.g., methods involving the anvil-side apparatus 219 and/or the score-side apparatus 220) may include additional steps not described in this disclosure or may omit steps described in this disclosure. Moreover, the disclosed order of the method steps are exemplary in nature with the understanding that the steps may be carried out in different orders in further examples. Moreover, whether or not described below, example steps described with the method schematically illustrated in FIGS. 23-32 may be similarly (e.g., identically) included to the method schematically illustrated in FIGS. 33-38. Likewise, whether or not described below, example steps described with the method schematically illustrated in FIGS. 33-38 may be similarly (e.g., identically) included to the method schematically illustrated in FIGS. 23-32.

Methods of FIGS. 23-38 are illustrated using the anvil-side apparatus 301 described with respect to FIG. 3 with the understanding that any example of the anvil-side apparatus of the present disclosure (e.g., the anvil-side apparatus 301, 501, 601, 701, 801, 901, 1001, 1202, 1302 shown in FIGS. 3-10, and 12-14) may be used in example methods of the disclosure. Furthermore, the method of FIGS. 23-29 is illustrated using the score-side vacuum port 1501 described with respect to FIG. 18 with the understanding that any example of the score-side vacuum port of the present disclosure (e.g., the score-side vacuum port 1203, 1501, 1601, 1702 shown in FIGS. 15-20) may be used in example methods of the disclosure.

Figures 23, 24:
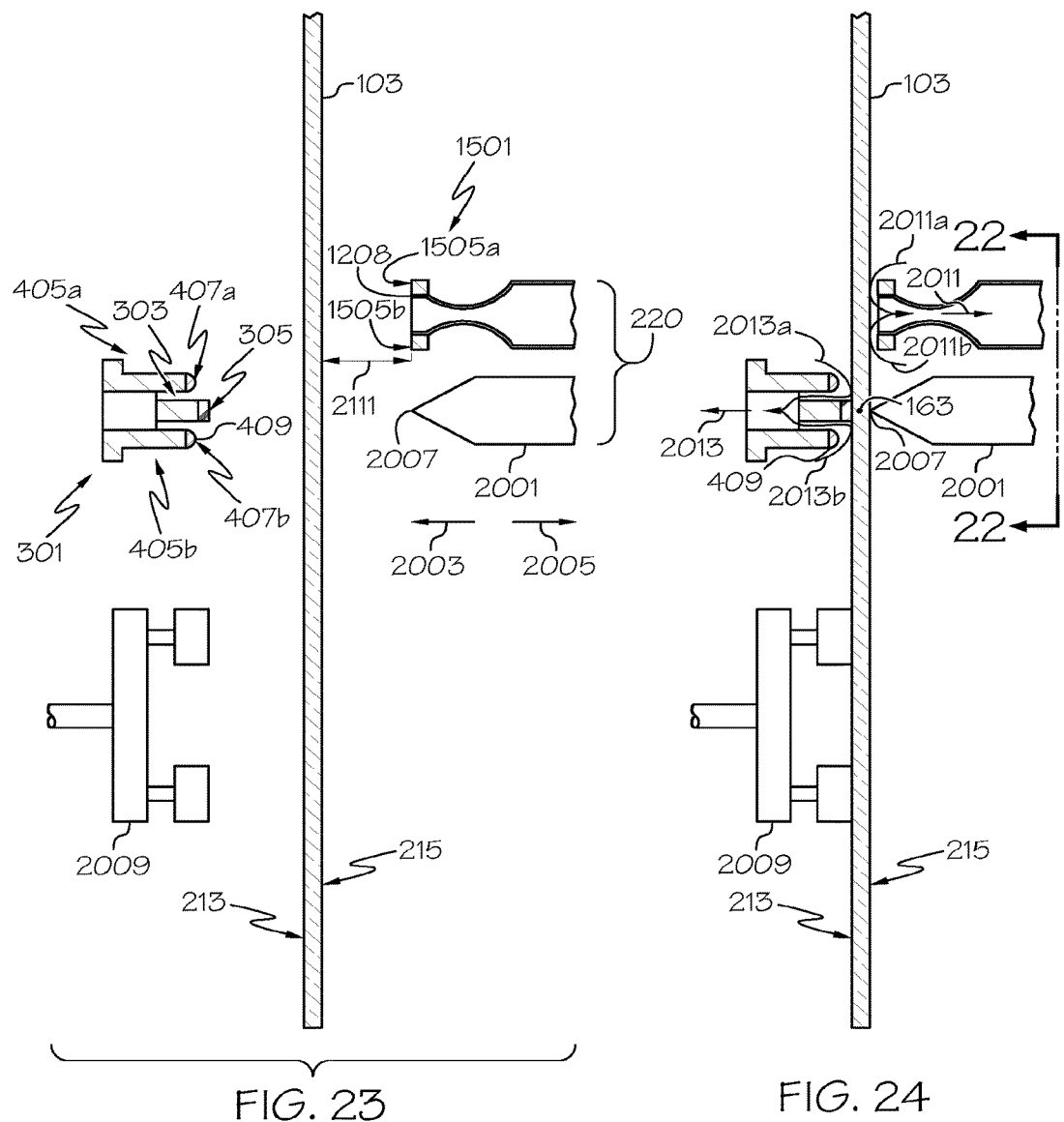
FIG. 23 illustrates an example step in a first method of separating a glass ribbon with an anvil-side apparatus spaced from a first major surface of the glass ribbon.
FIG. 24 illustrates another example step in the first method of separating a glass ribbon with the anvil-side apparatus being moved relative to the glass ribbon such that an elongated support surface of an elongated anvil member of the anvil-side apparatus engages a first major surface of the glass ribbon.

Methods of the disclosure will be initially described with the method schematically shown in FIGS. 23-32. As shown in FIG. 23, the anvil-side apparatus 301 is oriented a retracted position wherein the elongated support surface 305 is spaced a distance away and out of contact with the first major surface 213 of the glass ribbon 103.

As further shown in FIG. 23, the score-side apparatus 220 is also oriented in a retracted position. In the retracted position, the scoring device 2001 of the score-side apparatus 220 is oriented in a retracted position with the scoring element 2007 spaced a distance away from the second major surface 215 of the glass ribbon 103. In the retracted position, the score-side vacuum port 1501 of the score-side apparatus 220 is also oriented in a retracted position wherein an outermost surface (e.g., the outer edge 1208 and/or the elongated surfaces 1505a, 1505b) of the score-side vacuum port 1501 is spaced a retracted distance 2111 from the second major surface 215 of the glass ribbon 103.

A handling device 2009 may also be spaced away from the glass ribbon 103. The handling device may comprise a Bernoulli chuck, suction cup arrangement or other device considered to support a lower portion of the glass ribbon being separated and carrying away a separated glass sheet.

As shown in FIG. 24, the method can further include the step of moving the elongated anvil member 303, the first elongated nose 405a and the second elongated nose 405b (shown in FIG. 23) relative to the glass ribbon 103 to engage the elongated support surface 305 of the elongated anvil member 303 with the first major surface 213 of the glass ribbon 103 along the separation path 163 while the first outer elongated surface 407a of the first elongated nose 405a and the second outer elongated surface 407b of the second elongated nose 405b are each spaced from the first major surface 213 of the glass ribbon 103. The space between the elongated surfaces and the first major surface can be within a range of from about 2 mm to about 20 mm, such as from about 2 mm to about 15 mm, such as from about 3 mm to about 10 mm, such as from about 3 mm to about 8 mm, such as from about 4 mm to about 6 mm although other distances may be provided in further examples.

As further shown in FIG. 24, the method can further include the step of drawing fluid 2013 with the anvil-side apparatus 301 to draw fluid 2013a (e.g., the illustrated air stream) into the first anvil-side vacuum port to create a first fluid flow across the width "W" of the glass ribbon 103, wherein the fluid flow is drawn along the first major surface 213 of the glass ribbon 103 in a direction toward the elongated anvil member 303. Likewise, the method can further include the step of drawing a fluid flow 2013b (e.g., the illustrated air stream) into the second anvil-side vacuum port to create a second fluid flow across the width "W" of the glass ribbon 103, wherein the second fluid flow is drawn along the first major surface 213 of the glass ribbon in a direction toward the elongated anvil member 303. Indeed, as shown, the fluid flows 2013a, 2013b can both be drawn in respective opposite directions toward the elongated anvil member 303. In some examples, the fluid flows 2013a, 2013b are provided before or during the process of scoring the glass ribbon to help fix the glass ribbon 103 in position by pressing the first major surface 213 of the glass ribbon 103 against the elongated support surface 305 due to the suction and/or Bernoulli effect generated by the fluid flows 2013a, 2013b. In further examples, as discussed below the fluid flows 2013a, 2013b may also be provided during the step of breaking the glass sheet along the separation path to entrain and carry away resulting glass debris to preserve the pristine nature of the glass ribbon 103. The velocity of the fluid flows 2013a, 2013b can be within a range of from about 10 m/s to about 40 m/s, such as from about 20 m/s to about 30 m/s, such as about 25 m/s, although other velocities may be provided in further examples.

Figure 25:
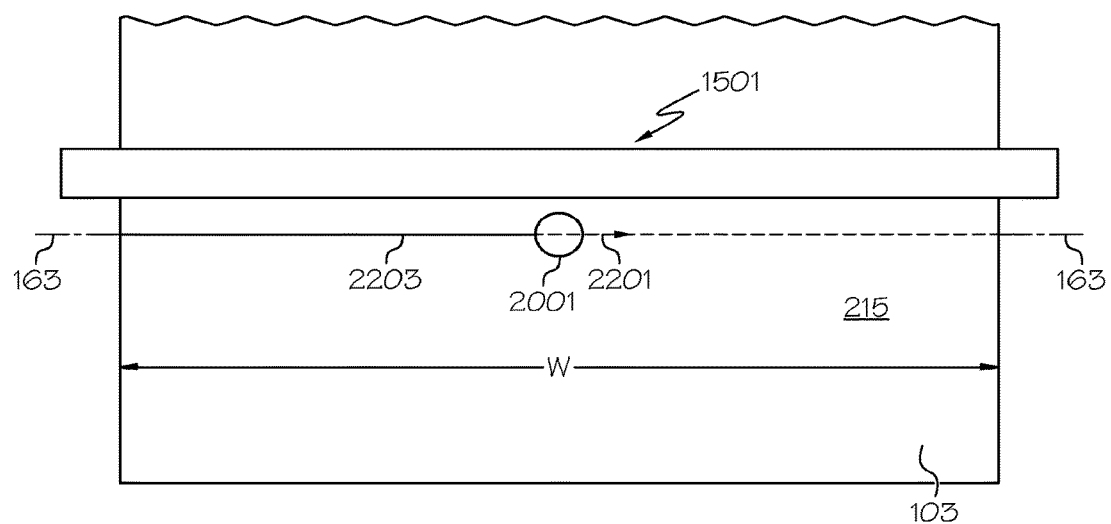
FIG. 25 is a rear side schematic view of the score-side vacuum device and an example scoring device along line 22-22 of FIG. 24, illustrating the scoring device scribing a score line in the second major surface of the glass ribbon.

The method can further include the step of moving the scoring device 2001 with respect to the glass ribbon 103 into the extended position (schematically shown in FIG. 24) with the scoring element 2007 engaging the second major surface 215 of the glass ribbon 103. As shown in FIG. 25, the method can further include the step of moving the scoring device 2001 in the extended position across the width "W" of the glass ribbon 103 along direction 2201 to create a score line 2203 in the second major surface 215 of the glass ribbon 103 along the separation path 163.

The score-side vacuum port 1501 can also be moved from the retracted position (see FIG. 23) in direction 2003 to the extended position shown in FIG. 24. In the extended position, the outermost surface (e.g., the outer edge 1208 and/or the elongated surfaces 1505a, 1505b) of the score-side vacuum port 1501 is spaced a distance from the second major surface 215 of the glass ribbon 103 to permit fluid streams 2011a, 2011b to be drawn into the score-side vacuum port 1501. The spaced distance can be within a range of from about 2 mm to about 15 mm, such as from about 3 mm to about 12 mm, such as from about 5 mm to about 10 mm, such as from about 5 mm to about 8 mm, such as about 6 mm although other distances may be provided in further examples. In one example, the score-side vacuum port 1501 and the scoring device 2001 may be moved together in direction 2003 from the retracted position shown in FIG. 23 to the extended position shown in FIG. 24.

In further examples, the score-side vacuum port is configured to move with respect to the scoring device, thereby allowing the scoring device 2001 to initially move from the retracted position to the extended position to allow scoring while the score-side vacuum port 1501 remains in the retracted position. As such, the scoring device 2001 and the score-side vacuum port 1501 may move together or independently in opposite directions 2003, 2005 between the retracted position and the extended position.

As shown, scoring may occur while the score-side vacuum port 1501 is in the extended position with a fluid stream 2011 being drawn as separate fluid streams 2011a, 2011b being drawn from opposite sides of the score-side vacuum port 1501 to merge into the fluid stream 2011. In such a manner, any glass debris generated by the scoring process itself may be entrained within one of the fluid streams 2011a, 2011b and carried away by fluid stream 2011.

As further shown in FIG. 24, the handling device 2009 may also be extended to engage the glass ribbon 103, thereby supporting the glass ribbon during the process of scoring the glass ribbon. The handling device 2009 can also remain engaged with the glass ribbon through the separation process as discussed more fully below.

As shown in FIG. 26, the scoring device 2001 may be moved in direction 2005 to the retracted position with the scoring element 2007 spaced from the second major surface 215 of the glass ribbon 103. In such a way, room is made for repositioning the score-side vacuum port 1501. The score-side vacuum port 1501 is configured to move in opposite directions 2301, 2303 transverse (e.g., perpendicular) to the opposite directions 2003, 2005 of the scoring device 2001. For example, once the scoring device 2001 is moved to the retracted position shown in FIG. 26, the score-side vacuum port 1501 may be moved in direction 2303 such that the entrance opening 1205 (see FIG. 18) of the score-side vacuum port 1203 is aligned with the separation path 163. Prior to or after alignment, a vacuum source (not shown) may be activated to draw a fluid stream into the entrance opening 1205. For example, as shown in FIG. 27, after alignment, the fluid flow 2401 may be generated that consequently pulls opposed fluid flows 2401a, 2401b about respective score-side noses 1503a, 1503b. The fluid flows 2401a, 2401b may travel at a wide range of velocities such as from about 10 m/s to about 40 m/s, such as from about 20 m/s to about 30 m/s, such as about 25 m/s.

Figure 30:
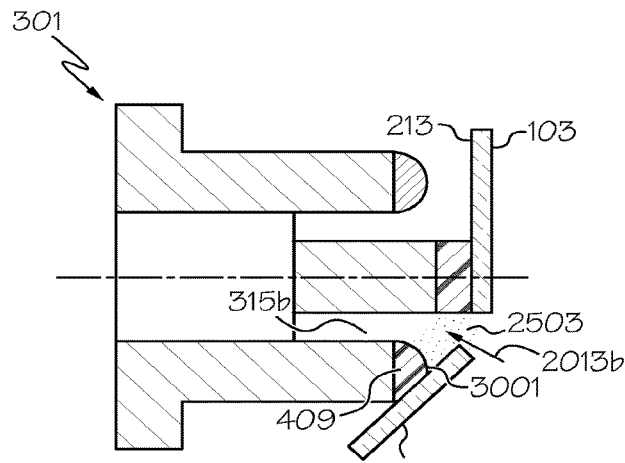
FIG. 30 illustrates another example step in the first method of separating a glass ribbon in view of an enlarged portion of the anvil-side apparatus taken at view 30 of FIG. 28 showing a method of separating a glass ribbon wherein a first major surface of the glass ribbon contacts the engagement device.
Figure 31:
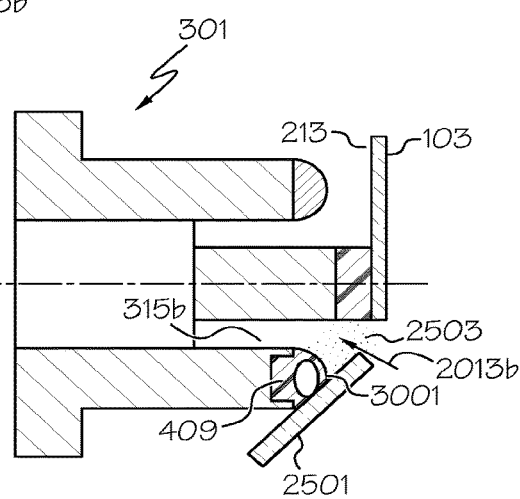
FIG. 31 illustrates another example step in the first method of separating a glass ribbon in view of an enlarged portion of the anvil-side apparatus taken at view 31 of FIG. 28 showing a method of separating a glass ribbon wherein a first major surface of the glass ribbon contacts the engagement device.
Figure 32:
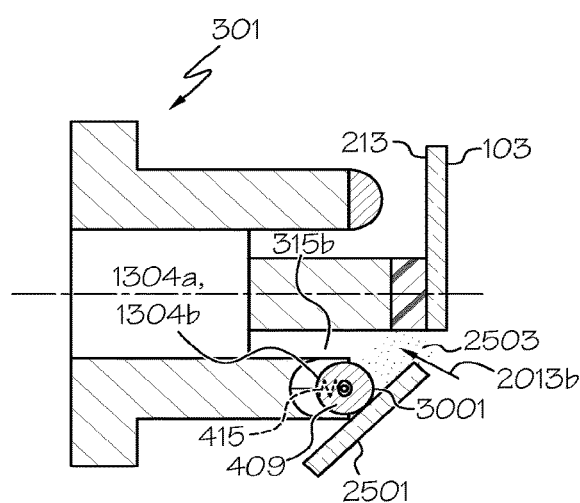
FIG. 32 illustrates another example step in the first method of separating a glass ribbon in view of an enlarged portion of the anvil-side apparatus taken at view 32 of FIG. 28 showing a method of separating a glass ribbon wherein a first major surface of the glass ribbon contacts the engagement device.

As shown in FIG. 28, the handling device 2009 may bend the glass ribbon 103 about the elongated anvil member 303 to break a glass sheet 2501 from the glass ribbon 103 along the separation path 163. The method may further include engaging the engagement device 409 with the first major surface 213 of the glass ribbon 103. FIGS. 30-32 show exemplary embodiments of the anvil-side apparatus 301 as the first major surface 213 of the glass ribbon 103 impacts the engagement device 409. FIG. 30 depicts the first major surface 213 of the glass ribbon 103 contacting an engagement device 409 comprising a solid, non-metallic bumper. Due to the resilient nature of non-metallic materials, the engagement device 409 compresses thereby absorbing energy from the impact. As the engagement device 409 compresses, the outer circumferential portion of the engagement device 409 contacting the first major surface 213 of the glass ribbon 103 becomes flush with said surface, thereby creating a seal 3001. The seal 3001 can be beneficial to help create a barrier to prevent debris 2503 from escaping. Indeed, the fluid flow 2013b will draw any nearby debris 2503 into the port 315b. FIG. 31 depicts the same phenomena as discussed in regards to FIG. 30, except the engagement device 409 comprises a hollow, non-metallic bumper. FIG. 32 depicts the first major surface 213 of the glass ribbon 103 contacting an engagement device 409 comprising a steel roller. Indeed, as shown, the steel roller is spring biased to an outwards position thereby enhancing the engagement device's 409 resiliency. As the first major surface 213 of the glass ribbon 103 impacts the engagement device 409, the spring 415 will compress thereby allowing the engagement device 409 to absorb energy from the impact. As the spring 415 compresses, the outer circumferential portion of the engagement device 409 engaging the first major surface 213 of the glass ribbon 103 creates a seal 3001.

The method can further include the step of entraining glass debris 2503 generated when breaking the glass sheet 2501 away from the remainder of the glass ribbon into at least one of the first fluid flow 2013a and the second fluid flow 2013b.

The method can then include the step of drawing the first fluid flow 2013a into the first anvil-side vacuum port 315a (see FIGS. 3 and 28) and drawing the second fluid flow 2013b into the second anvil-side vacuum port 315b, wherein entrained glass debris is drawn into at least one of the first anvil-side vacuum port and the second anvil-side vacuum port. In the event that the first major surface 213 of the glass ribbon 103 engages the engagement device 409, the resulting created seal 3001 provides the benefit of aiding the above step by improving the suction generated by the fluid flow 2013b.

As further shown in FIG. 28, the method can include drawing fluid (e.g., by separate fluid flows 2401a, 2401b) into the score-side vacuum port to create the fluid flow 2401. The method can then include entraining glass debris 2503 generated when breaking the glass sheet 2501 away from the remainder of the glass ribbon 103 and drawing the entrained glass debris 2503 into the score-side vacuum port. As shown in FIG. 29, the handling device 2009 may then be used to pull away the glass sheet 2501 for proper storage and/or further processing.

FIGS. 33-38 illustrate another example method of the disclosure. As shown in FIG. 33, the anvil-side apparatus 301 is oriented a retracted position wherein the elongated support surface 305 is spaced a distance away and out of contact with the first major surface 213 of the glass ribbon 103.

As further shown in FIG. 33, the score-side apparatus 220 is also oriented in a retracted position. In the retracted position, the scoring device 2001 of the score-side apparatus 220 is oriented in a retracted position with the scoring element 2007 spaced a distance away from the second major surface 215 of the glass ribbon 103. In the retracted position, the score-side vacuum port 1803 of the score-side apparatus 220 is also oriented in a retracted position wherein an outermost tip 1809 of the opening 1805 (see FIG. 21) is spaced a retracted distance 2701 from the second major surface 215 of the glass ribbon 103.

As shown in FIG. 34, the method can further include the step of moving the elongated anvil member 303, the first elongated nose 405a and the second elongated nose 405b (see FIG. 33) relative to the glass ribbon 103 to engage the elongated support surface 305 of the elongated anvil member 303 with the first major surface 213 of the glass ribbon 103 along the separation path 163 while the first outer elongated surface of the first elongated nose 405a and the second outer elongated surface of the second elongated nose 405b are each spaced from the first major surface 213 of the glass ribbon 103.

As further shown in FIG. 34, the method can further include the step of drawing fluid 2013a (e.g., the illustrated air stream) into the first anvil-side vacuum port to create a first fluid flow across the width "W" of the glass ribbon 103, wherein the fluid flow is drawn along the first major surface 213 of the glass ribbon 103 in a direction toward the elongated anvil member 303. Likewise, the method can further include the step of drawing a fluid flow 2013b (e.g., the illustrated air stream) into the second anvil-side vacuum port to create a second fluid flow across the width "W" of the glass ribbon 103, wherein the second fluid flow is drawn along the first major surface 213 of the glass ribbon in a direction toward the elongated anvil member 303. Indeed, as shown, the fluid flows 2013a, 2013b can both be drawn in respective opposite directions toward the elongated anvil member 303. In some examples, the fluid flows 2013a, 2013b are provided before or during the process of scoring the glass ribbon to help fix the glass ribbon 103 in position by pressing the first major surface 213 of the glass ribbon 103 against the elongated support surface 305 due to the suction and/or Bernoulli effect generated by the fluid flows 2013a, 2013b. In further examples, as discussed below the fluid flows 2013a, 2013b may also be provided during the step of breaking the glass sheet along the separation path to entrain and carry away resulting glass debris to preserve the pristine nature of the glass ribbon 103.

Figure 35:
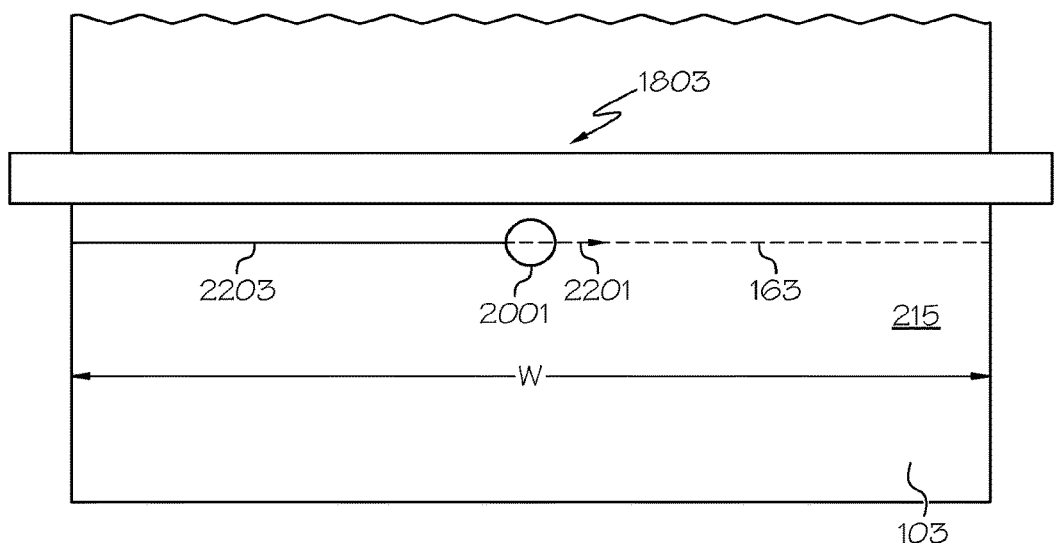
FIG. 35 is a rear side schematic view of the score-side vacuum device and an example scoring device along line 35-35 of FIG. 34, illustrating the scoring device scribing a score line in the second major surface of the glass ribbon.

The method can further include the step of moving the scoring device 2001 with respect to the glass ribbon 103 into the extended position (schematically shown in FIG. 34) with the scoring element 2007 engaging the second major surface 215 of the glass ribbon 103. As shown in FIG. 35, the method can further include the step of moving the scoring device 2001 in the extended position across the width "W" of the glass ribbon 103 along direction 2201 to create a score line 2203 in the second major surface 215 of the glass ribbon 103 along the separation path 163.

The score-side vacuum port 1803 can also be moved from the retracted position (see FIG. 33) in direction 2003 to the partially-extended position shown in FIG. 34. In the partially-extended position, fluid flow 2801 may be drawn into the score-side vacuum port 1803 during scoring to help entrain glass debris for removal. The score-side vacuum port 1803 can be extended to a distance that will not interfere with the process of scoring the glass ribbon with the scoring device 2001 while still extending to a position that may facilitate removal of glass debris during the scoring process. In one example, the score-side vacuum port 1803 and the scoring device 2001 may be moved together in direction 2003 from the retracted position shown in FIG. 33 to the extended position shown in FIG. 34.

In further examples, the score-side vacuum port 1803 is configured to move with respect to the scoring device 2001, thereby allowing the scoring device 2001 to initially move from the retracted position to the extended position to allow scoring while the score-side vacuum port 1803 remains in the retracted position or does not extend toward the glass ribbon as far as the scoring device. As such, the scoring device 2001 and the score-side vacuum port 1803 may move together or independently in opposite directions 2003, 2005 between the retracted position and extended positions.

As further shown in FIG. 34, the handling device 2009 may also be extended to engage the glass ribbon 103, thereby supporting the glass ribbon during the process of scoring the glass ribbon. The handling device 2009 can also remain engaged with the glass ribbon through the separation process as discussed more fully below.

As shown in FIG. 36, the scoring device 2001 may be moved in direction 2005 to the retracted position with the scoring element 2007 spaced from the second major surface 215 of the glass ribbon 103. As further shown in FIG. 36, the score-side vacuum port 1803 may be further extended to the position where the outermost tip 1809 of the opening is located in close proximity to the second major surface 215 of the glass ribbon 103. For example, the outermost tip 1809 can be located a distance from the second major surface 215 within a range of from about 5 mm to about 25 mm, such as from about 10 mm to about 20 mm, such as from about 10 mm to about 15 mm although other distances may be provided in further examples. As shown, a debris entrainment flow 3601 may be developed that travels along the second major surface 215 of the glass ribbon over the separation path 163. The debris entrainment flow 3601 may travel at a wide range of velocities such as from about 5 m/s to about 25 m/s, such as from about 10 m/s to about 20 m/s, such as from about 12 m/s to about 15 m/s. In this embodiment, the score-side vacuum port 1803 may translate only in the directions 2003 and 2005 although the score-side vacuum port 1803 may also travel in a direction transverse to the directions 2003 and 2005 to reposition the opening of the port closer to the separation path 163.

As shown in FIG. 37, the handling device 2009 may bend the glass ribbon 103 about the elongated anvil member 303 to break a glass sheet 2501 from the glass ribbon along the separation path 163. The method may further include engaging the engagement device 409 with the first major surface 213 of the glass ribbon 103. FIGS. 30-32 show exemplary embodiments of the anvil-side apparatus 301 as the first major surface 213 of the glass ribbon 103 impacts the engagement device 409. FIG. 30 depicts the first major surface 213 of the glass ribbon 103 contacting an engagement device 409 comprising a solid, non-metallic bumper. Due to the resilient nature of non-metallic materials, the engagement device 409 compresses thereby absorbing energy from the impact. As the engagement device 409 compresses, the outer circumferential portion of the engagement device 409 contacting the first major surface 213 of the glass ribbon 103 becomes flush with said surface, thereby creating a seal 3001. FIG. 31 depicts the same phenomena as discussed in regards to FIG. 30, except the engagement device 409 comprises a hollow, non-metallic bumper. FIG. 32 depicts the first major surface 213 of the glass ribbon 103 contacting an engagement device 409 comprising a steel roller. Indeed, as shown, the steel roller is spring biased to an outwards position thereby enhancing the engagement device's 409 resiliency. As the first major surface 213 of the glass ribbon 103 impacts the engagement device 409, the spring 415 will compress thereby allowing the engagement device 409 to absorb energy from the impact. As the spring 415 compresses, the outer circumferential portion of the engagement device 409 engaging the first major surface 213 of the glass ribbon 103 creates a seal 3001.

The method can include entraining glass debris 2503 generated when breaking the glass sheet 2501 away from the remainder of the glass ribbon into at least one of the first fluid flow 2013a and the second fluid flow 2013b. The method can then include the step of drawing the first fluid flow 2013a into the first anvil-side vacuum port 315a and drawing the second fluid flow 2013b into the second anvil-side vacuum port 315b, wherein entrained glass debris is drawn into at least one of the first anvil-side vacuum port and the second anvil-side vacuum port. In the event that the first major surface 213 of the glass ribbon 103 engages the engagement device 409, the resulting created seal 3001 provides the benefit of aiding the above step by improving the suction generated by the fluid flow 2013b.

Figure 38:
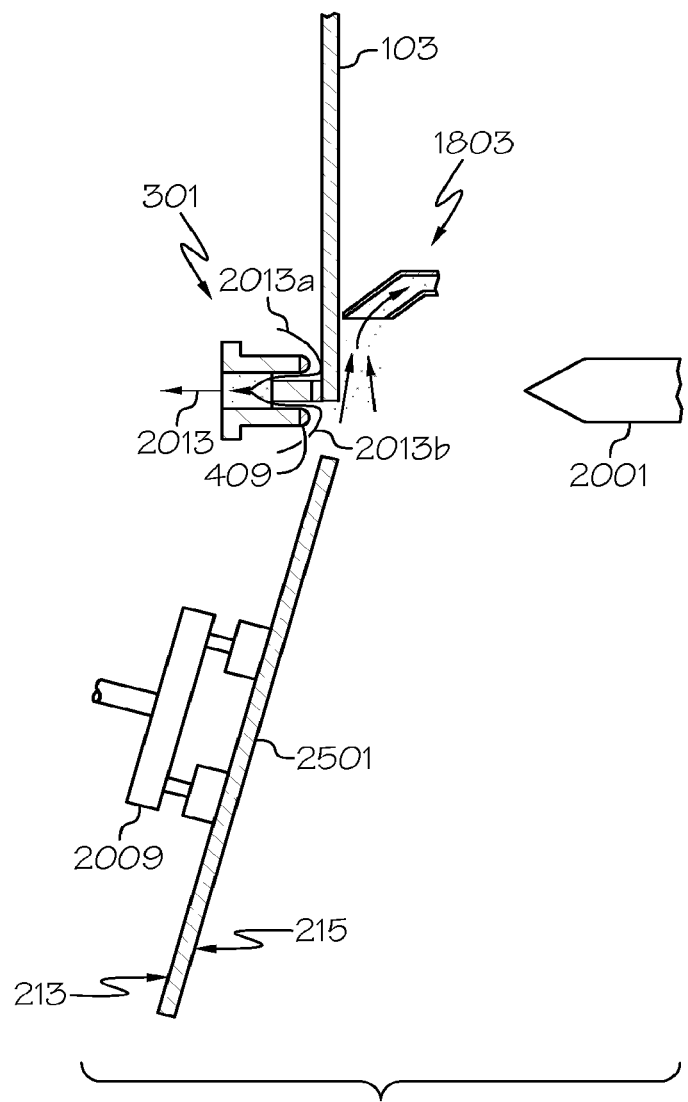
FIG. 38 illustrates another example step in the second method of separating the glass ribbon wherein a glass sheet is moved away from the glass ribbon.

As further shown in FIG. 37, the method can also include drawing fluid into the score-side vacuum port 1803 to create the debris entrainment flow 3601. The method can then include entraining glass debris 2503 generated when breaking the glass sheet 2501 away from the remainder of the glass ribbon 103 and drawing the entrained glass debris 2503 into the score-side vacuum port 1803. As shown in FIG. 38, the handling device 2009 may then be used to pull away the glass sheet 2501 for proper storage and/or further processing.

The various embodiments of the disclosure provide enhanced entrainment of glass debris during the separation process. Indeed, glass debris may be entrained in fluid flows and carried away by the anvil-side apparatus 219. Likewise, glass debris may be entrained in fluid flows and carried away by the score-side apparatus 220. Consequently less debris is released, thereby preventing contamination of the surrounding environment and the glass ribbon.

FIG. 11 illustrates results of a simulation demonstrating expected performance of various anvil-side apparatus 219 in accordance with the disclosure where the vertical or "Y-axis" represents nozzle efficiency and the horizontal or "X-axis" represents particle size in microns. Plot 1101 demonstrates the efficiency vs. particle size for a first anvil-side apparatus. Plot 1103 demonstrates the efficiency vs. particle size for the anvil-side apparatus 301 shown in FIGS. 3-4. As shown, the anvil-side apparatus 301 can achieve approximately 100% efficiency for particles up to 250 microns. Plot 1105 and plot 1107 each demonstrate the efficiency vs. particle size for the anvil-side apparatus 901 (see FIG. 9) and the anvil-side apparatus 1001 (see FIG. 10), respectively. As shown, the anvil-side apparatus 901 and the anvil-side apparatus 1001 can each achieve approximately 100% efficiency for particles up to 300 microns.

Figure 22:
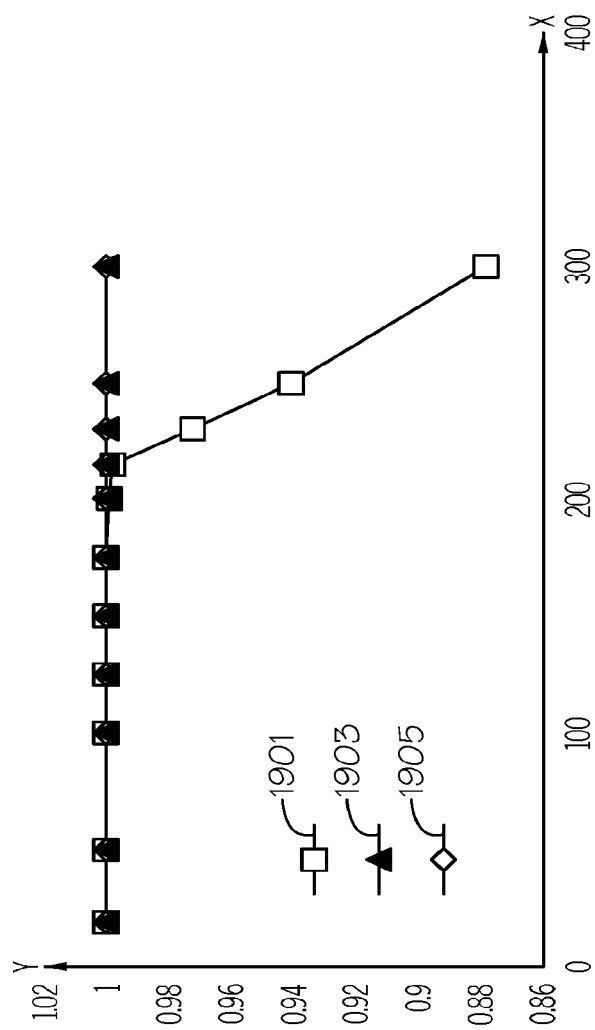
FIG. 22 is a plot comparing efficiency of various score-side vacuum devices with respect to particle size.

FIG. 22 illustrates results of a simulation demonstrating expected performance of various score-side apparatus 220 in accordance with the disclosure where the vertical or "Y-axis" represents nozzle efficiency and the horizontal or "X-axis" represents particle size in microns. Plot 1901 demonstrates the efficiency vs. particle size for the score-side vacuum port 1203 shown in FIGS. 15-17. As shown, the score-side vacuum port 1203 can achieve approximately 100% efficiency for particles over 200 microns. Plot 1903 and plot 1905 each demonstrate the efficiency vs. particle size for the score-side vacuum port 1501 (see FIG. 18) and the score-side vacuum port 1601 (see FIG. 19), respectively. As shown, the score-side vacuum port 1501 and the score-side vacuum port 1601 can each achieve approximately 100% efficiency for particles up to 300 microns.

It will be apparent to those skilled in the art that various modifications and variations can be made to the present disclosure without departing from the spirit and scope of the appended claims. Thus, it is intended that the present disclosure cover the modifications and variations of the embodiments herein provided they come within the scope of the appended claims and their equivalents.

What is claimed is:

1. A glass manufacturing apparatus configured to facilitate a process of separating a glass ribbon along a separation path extending across a width of the glass ribbon, the glass manufacturing apparatus comprising:
   an elongated anvil member including an elongated support surface configured to engage a first major surface of the glass ribbon along the separation path; and
   at least one elongated nose provided with an engagement device comprising at least one of a nonmetallic bumper and a roller recessed with respect to the elongated support surface of the elongated anvil member,
   wherein the elongated nose and the elongated anvil member define at least one anvil-side vacuum port including an elongated length and a width extending perpendicular to the elongated length between the elongated nose and the elongated anvil member, and wherein the anvil-side vacuum port is configured to remove glass debris during the process of separating the glass ribbon.

2. The glass manufacturing apparatus of claim 1, wherein the engagement device is recessed a distance from the elongated support surface of the elongated anvil member within a range of from about 2 mm to about 20 mm.

3. The glass manufacturing apparatus of claim 1, wherein the width of the anvil-side vacuum port is within a range of from about 1 mm to about 12 mm.

4. The glass manufacturing apparatus of claim 1, wherein the engagement device is removably attached to the elongated nose.

5. The glass manufacturing apparatus of claim 1, wherein the engagement device comprises a resilient member configured to absorb energy from an impact.

6. The glass manufacturing apparatus of claim 5, wherein the resilient member comprises an elastomeric material.

7. The glass manufacturing apparatus of claim 1, wherein the engagement device comprises a roller configured to rotate about an axis.

8. The glass manufacturing apparatus of claim 7, wherein the roller is removably attached to the elongated nose.

9. The glass manufacturing apparatus of claim 7, wherein the roller comprises an elastomeric material.

10. The glass manufacturing apparatus of claim 7, wherein the roller comprises a plurality of rollers.

11. The glass manufacturing apparatus of claim 10, wherein the plurality of rollers are disposed in series along a common axis.

12. The glass manufacturing apparatus of claim 1, wherein the at least one elongated nose includes:
    a first elongated nose including an outer elongated surface recessed with respect to the elongated support surface of the elongated anvil member; and
    a second elongated nose provided with the engagement device recessed with respect to the elongated support surface of the elongated anvil member,
    wherein the elongated anvil member is disposed between the first elongated nose and the second elongated nose, and wherein the at least one anvil-side vacuum port includes a first anvil-side vacuum port defined by the first elongated nose and the elongated anvil member and a second anvil-side vacuum port defined by the second elongated nose and the elongated anvil member.

13. The glass manufacturing apparatus of claim 12, wherein the first anvil-side vacuum port includes a first width defined between the elongated anvil member and the first elongated nose and the second anvil-side vacuum port includes a second width defined between the elongated anvil member and the second elongated nose.

14. The glass manufacturing apparatus of claim 13, wherein the first width is different than the second width.

15. The glass manufacturing apparatus of claim 13, wherein the first width is substantially equal to the second width.

16. A method of separating a glass ribbon along a separation path extending across a width of the glass ribbon with the glass manufacturing apparatus of claim 1, the method comprising the steps of:
    (I) moving the elongated anvil member and the elongated nose relative to the glass ribbon to engage the elongated support surface of the elongated anvil member with the first major surface of the glass ribbon along the separation path while the engagement device of the elongated nose is spaced from the first major surface of the glass ribbon;
    (II) drawing fluid into the anvil-side vacuum port to create a fluid flow across the width of the glass ribbon, wherein the fluid flow is drawn along the first major surface of the glass ribbon in a direction toward the elongated anvil member;
    (III) bending the glass ribbon about the elongated anvil member to break a glass sheet from the glass ribbon along the separation path;
    (IV) entraining glass debris generated during step (III) into the fluid flow; and
    (V) drawing the fluid flow with entrained glass debris into the anvil-side vacuum port.

17. The method of claim 16, wherein step (III) includes bending the glass ribbon about the elongated anvil member until the engagement device engages the first major surface of the glass ribbon.

18. A method of separating a glass ribbon along a separation path extending across a width of the glass ribbon with the glass manufacturing apparatus of claim 12, the method comprising the steps of:
    (I) moving the elongated anvil member, the first elongated nose and the second elongated nose relative to the glass ribbon to engage the elongated support surface of the elongated anvil member with the first major surface of the glass ribbon along the separation path while the outer elongated surface of the first elongated nose and the engagement device are each spaced from the first major surface of the glass ribbon;
    (II) drawing fluid into the first anvil-side vacuum port to create a first fluid flow across the width of the glass ribbon, wherein the fluid flow is drawn along the first major surface of the glass ribbon in a direction toward the elongated anvil member;
    (III) drawing fluid into the second anvil-side vacuum port to create a second fluid flow across the width of the glass ribbon, wherein the second fluid flow is drawn along the first major surface of the glass ribbon in a direction toward the elongated anvil member;
    (IV) bending the glass ribbon about the elongated anvil member to break a glass sheet from the glass ribbon along the separation path;
    (V) entraining glass debris generated during step (IV) into at least one of the first fluid flow and the second fluid flow; and (VI) drawing the first fluid flow into the first anvil-side vacuum port and drawing the second fluid flow into the second anvil-side vacuum port, wherein entrained glass debris is drawn into at least one of the first anvil-side vacuum port and the second anvil-side vacuum port.

19. The method of claim 18, wherein step (IV) includes bending the glass ribbon about the elongated anvil member until the engagement device engages the first major surface of the glass ribbon.

* * * * *